United States Patent
Kobayashi et al.

(10) Patent No.: US 6,782,134 B2
(45) Date of Patent: Aug. 24, 2004

(54) TRANSMISSION APPARATUS OF VIDEO INFORMATION, TRANSMISSION SYSTEM OF VIDEO INFORMATION AND TRANSMISSION METHOD OF VIDEO INFORMATION

(75) Inventors: Hisakazu Kobayashi, Akashi (JP); Takashi Masuno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 657 days.

(21) Appl. No.: 09/845,837

(22) Filed: Apr. 30, 2001

(65) Prior Publication Data

US 2002/0159645 A1 Oct. 31, 2002

(30) Foreign Application Priority Data

Apr. 27, 2001 (JP) ........................................ 2001-132833

(51) Int. Cl.⁷ .............................. G06K 9/36; G06K 9/46
(52) U.S. Cl. ........................ 382/236; 382/239; 382/233; 382/243; 375/240.08
(58) Field of Search ................................ 382/232, 233, 382/236, 239, 190, 218, 243; 375/240.02, 240.08, 240.13, 240.25

(56) References Cited

U.S. PATENT DOCUMENTS 5,565,921 A * 10/1996 Sasaki et al. .......... 375/240.13
5,588,075 A * 12/1996 Chiba et al. ................ 382/239
6,188,796 B1 * 2/2001 Kadono ...................... 382/243
6,519,286 B1 * 2/2003 Porter et al. .......... 375/240.13

* cited by examiner

*Primary Examiner*—Timothy M. Johnson
(74) *Attorney, Agent, or Firm*—Akin Gump Strauss Hauer & Feld, L.L.P.

(57) ABSTRACT

The present invention provides a transmission apparatus for video information that allows wireless transmission of video information at a low rate regardless of differences in OSs. A transmission apparatus for video information according to the present invention has:

an input part for inputting video information transmitted by a central processing unit; a level information generation part for generating level information of each pixel on a screen based on the video information; a memory part for storing level information of each pixel of the entire region of the screen; a comparison part for comparing level information stored in the memory part with level information outputted by the level information generation part with respect to said pixel associated with the video information and for outputting comparison information; a region extraction part for extracting a region that includes a pixel wherein the level information stored in the memory part and the level information based on the video information are different according to the comparison information; a compression part for compressing the information amount of the level information of each pixel of the extracted region of the screen; and a communication part for transmitting position information of the region of the screen and the compressed level information.

14 Claims, 12 Drawing Sheets

TRANSMISSION APPARATUS OF VIDEO INFORMATION, TRANSMISSION SYSTEM OF VIDEO INFORMATION AND TRANSMISSION METHOD OF VIDEO INFORMATION

BACKGROUND OF THE INVENTION

The present invention relates to a transmission apparatus for video information, a transmission system for video information and a transmission method for video information.

The application field of computers is growing wider in recent years. Under these conditions, a computer which is divided into a part (referred to as "first terminal apparatus") which includes a CPU (central processing unit) or the like, and a part (referred to as "second terminal apparatus") which includes a display part for the video (or a display part and an input part) is in demand by the market.

FIG. 10 is a conceptual diagram of a computer which has a first terminal apparatus and a second terminal apparatus. In FIG. 10 the first terminal apparatus which includes a CPU is denoted as 1001, the second terminal apparatus which includes a display part and a pen input part is denoted as 1002, a conventional PC (abbreviation of personal computer which has a CPU and a display part) is denoted as 1003, a docking station is denoted as 1004, a keyboard is denoted as 1005 and a display part is denoted as 1006. The first terminal apparatus 1001 has a CPU 1011 and a wireless communication part 1012. The second terminal apparatus 1002 has a display and pen input part 1021 and a wireless communication part 1023. The user can input an instruction into a computer by touching the display and pen input part 1021 with a pen 1022.

Video information generated in the CPU 1011 of the first terminal apparatus 1001 is transmitted from the wireless communication part 1012. The wireless communication part 1023 of the second terminal apparatus 1002 receives the video information and transmits it to the display and pen input part 1021. The display and pen input part 1021 displays the inputted video information.

When the user inputs, with a pen 1022, an instruction to the computer by means of the display and pen input part 1021 of the second terminal apparatus, this instruction information is transmitted from the wireless communication part 1023. This instruction information is inputted to the wireless communication part 1012 of the first terminal apparatus 1001 and is transmitted to the CPU 1011. The CPU 1011 inputs the instruction information and processes information according to the instruction information.

The user generally utilizes only the first terminal apparatus 1001 and the second terminal apparatus 1002. The user can move about freely while carrying the second terminal apparatus 1002, which is light and has no connection lines.

The user can also construct and utilize a computer system comprising the first terminal apparatus 1001, the docking station 1004, the keyboard 1005 and the display part 1006 by connecting the docking station 1004 to the first terminal apparatus 1001 and by connecting the keyboard 1005 and the display part 1006 to the docking station 1004.

The conventional PC 1003 can incorporate a wireless communication part 1031, which is an option. The video information generated by the CPU of the PC 1003 is transmitted from the wireless communication part 1031. The wireless communication part 1023 of the second terminal apparatus 1002 receives the video information and transmits it to the display and pen input part 1021. The display and pen input part 1021 displays the inputted video information.

When the user inputs, with the pen 1022, an instruction to the computer by means of the display and pen input part 1021 of the second terminal apparatus, this instruction information is transmitted from the wireless communication part 1023. The wireless communication part 1031, which is incorporated in the conventional PC 1003, inputs this instruction information and transmits it to the CPU. The CPU of the conventional PC 1003 inputs the instruction information and processes information according to the instruction information.

In this manner, the user can utilize a conventional PC as the first terminal apparatus 1001.

FIG. 11 is a block diagram of a conventional computer which has a first terminal apparatus and a second terminal apparatus (primarily shows a transmission apparatus for video information and a transmission system for video information included in the computer). The conventional computer of FIG. 11 includes a transmission apparatus for video information which transmits video information from the first terminal apparatus to the second terminal apparatus.

In FIG. 11, the first terminal apparatus is denoted as 1101, the second terminal apparatus is denoted as 1102, a display (display part) is denoted as 1003 and a wire for connecting the first terminal apparatus 1101 with the second terminal apparatus 1102 is denoted as 1104.

The first terminal apparatus 1101 has a CPU 1111, a video graphics control part 1113, an LCD driving part 1115 (liquid crystal display driving part), a liquid crystal display 1116 and a communication board 1114. The description of a ROM, a RAM or the like, which do not directly relate to the present invention, is omitted though they are indispensable to a computer.

The CPU 1111, the video graphics control part 1113 and the communication board 1114 are connected to each other via a PCI bus 1112.

The video graphics control part 1113 has a CPU 1121, an input/output part 1122, a RAM 1123, a VRAM 1124, a write in/read out address register 1125, a read out address register 1126, a clock generator 1127 and a parallel/serial conversion part 1128.

The CPU 1121, the input/output part 1122, the RAM 1123, the VRAM 1124, the write in/read out address register 1125 and the like are connected to each other via an internal bus 1129.

The CPU 1111 transmits an instruction described in a software language (for example, DirectX (registered trademark of Microsoft Corporation)) for changing the video to the video graphics control part 1113 and the communication board 1114 via the PCI bus 1112.

The input/output part 1122 of the video graphics control part 1113 transmits the inputted instruction described in a software language for changing the video to the CPU 1121 via the internal bus 1129.

The CPU 1121 converts an instruction described in a software language (program arranged on an Application Programming Interface of OS of the computer) for changing the video into level information (for example, information concerning the value to which the value of any address of the VRAM is changed) of each pixel at a hardware level by utilizing a video information decoder 1141. The RAM 1123 is a scratch region at the time when level information of each pixel is generated by utilizing the video information decoder 1141. The VRAM 1124 is a dual port RAM for video display which has a port which can write in or read out by randomly accessing an arbitrary address (an address is designated by the write in/read out address register 1125) and a port which can read out data of each address at a high rate and in a constant order (an address is designated by the read out address register 1126). The level information of each pixel (level information of each of the sub-pixels RGB), attribute data and the like are stored in the VRAM 1124.

The CPU 1121 and the like set an address in the write in/read out address register 1125. Information is written in to this address through the internal bus 1129 and information is read out from this address through the internal bus 1129.

The clock generator 1127 sets a read out address register 1126. The set value of the address register 1126 is generally incremented at an extremely high rate. The information of the address designated by the address register 1126 is read out and forwarded to the parallel/serial conversion part 1128. The parallel/serial conversion part 1128 converts the inputted information of each address (level information of each pixel) into serial data, which are outputted.

The output signal of the parallel/serial conversion part 1128 is transmitted to the LCD driving part 1115 and is converted into an LCD (liquid crystal display) driving signal. The LCD driving part 1115 drives the liquid crystal display 1116. The liquid crystal display 1116 displays the video.

In addition, the output signal of the parallel/serial conversion part 1128 is transmitted to the external display 1103. The display 1103 displays the video.

The communication board 1114 receives an instruction which is described in a software language for changing the video (outputted by the CPU 1111) and which is transmitted through the PCI bus 1112. The communication board 1114 transmits the instruction described in a software language for changing the video to the second terminal apparatus 1102 through connection via the wire 1104.

The communication board 1131 of the second terminal apparatus 1102 transmits the received instruction described in a software language for changing the video to a video graphics control part 1132. The video graphics control parts 1132 and 1113 have the same configuration. The video graphics control part 1132 generates display data of each pixel based on the instruction described in a software language for changing the video, and outputs them. A display 1133 displays the video by driving each pixel in accordance with the display data.

FIG. 12 schematically shows the hierarchical structure of a conventional computer which has the first terminal apparatus 1101 and the second terminal apparatus 1102. The first terminal apparatus 1101 has a software layer 1203 which is the upper layer and a hardware layer 1204 which is the lower layer. The software layer 1203 has an application program 1211, an OS (operating system) 1212, and device drivers 1213 and 1214. The hardware layer 1204 has the video graphics control part 1113 (including the VRAM 1124), the display 1103 and the communication board 1114. The application program 1211 operates on the OS 1212 while the device drivers 1213 and 1214 depend on the OS 1212.

The video graphics control part 1113 is controlled by the device driver 1213 while the communication board 1114 is controlled by the device driver 1214.

The second terminal apparatus 1102 has a software layer 1205, which is upper layer, and a hardware layer 1206, which is the lower layer. The software layer 1205 has device drivers 1215, 1216 and 1217 which depend on the OS 1212 stored in the first terminal apparatus. The hardware layer 1206 has the communication board 1131, a pen input part 1231, the video graphics control part 1132 (including a VRAM 1232) and the display 1133. The device drivers 1215, 1216 and 1217 communicate with the OS 1212 through the communication boards 1114 and 1131.

The video graphics control part 1132 is controlled by the device driver 1217, the pen input part 1231 is controlled by the device driver 1216 and the communication board 1131 is controlled by the device driver 1215.

The user can input video information (arbitrary information concerning video drawing) described in a software language by using an application program 1211 (for example, DirectX) located on the OS 1212. This information for changing the video is transmitted to the OS 1212 (OS 1212 operates on the CPU 1111) through the API 1221 (Application Programming Interface, which is included in OS). The OS 1212 transmits this video information to the device driver 1213. The device driver 1213 generates level information of each pixel based on this video information and stores the level information of each pixel in the VRAM 1124. The level information of each pixel stored in the VRAM 1124 is read out by a hardware circuit (clock generation circuit 1127 or the like) and displayed on the display 1103.

In addition, the OS 1212 transmits the inputted video information to the device driver 1217 of the second terminal apparatus through the communication boards 1114 and 1131. The device driver 1217 generates level information of each pixel based on this video information and stores the level information of each pixel in the VRAM 1232. The level information of each pixel stored in the VRAM 1232 is read out by a hardware circuit (clock generation circuit or the like) and is displayed on the display 1133.

The user can input an instruction (assumed to be a video change instruction) to the computer from the pen input part 1231 of the hardware layer 1206. The video change instruction inputted by the user is converted into information (video change instruction information) in the software by the device driver 1216. The video change instruction information is transmitted to the OS 1212 through the communication boards 1131 and 1114. The OS 1212 transmits this video change instruction information to the application program 1211 through the API 1221. The application program 1211 generates new video information according to this video change instruction information.

In the following, by carrying out the above described process, the video graphics control parts 1113 and 1132 output level information of each pixel which are newly generated, respectively.

In the conventional computer which has the first terminal apparatus and the second terminal apparatus, however, the exchange of information between the first terminal apparatus and the second terminal apparatus is carried out by a video change instruction described in a software language. Therefore, transmission and reception of data cannot carried out between the first terminal apparatus and the second terminal apparatus wherein different OSs are installed.

For example, in FIG. 12, in the case that the device drivers 1215, 1216 and 1217 installed in the second terminal apparatus 1102 depend on an OS which is different from the OS 1212 installed in the first terminal apparatus 1101, the device driver 1217 does not respond to the inputted video information even when the video information is transmitted from the first terminal apparatus to the second terminal apparatus.

In particular, the user who has a plurality of first terminal apparatus in which different OSs are installed must precisely select the combination between the first terminal apparatus wherein the first OS is installed and the second terminal apparatus which depends on the first OS as well as the combination between the first terminal apparatus wherein the second OS is installed and the second terminal apparatus which depends on the second OS for use and, therefore, mistakes can easily occur. For example, in the case that that the user goes out carrying the first terminal apparatus wherein the first OS is installed and the second terminal apparatus which depends on the second OS those apparatus, they cannot be used after all. Therefore, the user who has a plurality of first terminal apparatus in which different OSs are installed requires a data forwarding system between the first terminal apparatus and the second terminal apparatus which is independent of differences in OSs.

There is also the idea of transmitting the output signal of the parallel/serial conversion part 1128 to the second terminal apparatus 1102 without change. However, in the case, for example, that a full color display of 8 bits each for RGB is shown on the screen of UXGA (1600×1200 pixels), the output signal of the parallel/serial conversion part 1128 exceeds 46 Mbps. It is extremely difficult to transmit data at such a high rate in a wireless manner.

The present invention has the purpose of providing a transmission apparatus for video information, a transmission system for video information and a transmission method for video information which make possible a wireless transmission of video information at a low rate regardless of differences in OSs.

SUMMARY OF THE INVENTION

The present invention has the following configurations in order to solve the above described problem.

The invention according to claim 1 is a transmission apparatus for video information characterized by having:

an input part for inputting video information transmitted by a central processing unit; a level information generation part for generating level information of each pixel on a screen based on, at least, said video information; a memory part for storing level information of each pixel of the entire region of the screen; a comparison part for comparing level information stored in said memory part with level information outputted by said level information generation part with respect to said pixel associated with said video information and for outputting comparison information; a region extraction part for extracting a region that includes a pixel wherein the level information stored in said memory part and the level information based on said video information are different according to said comparison information; a compression part for compressing the information amount of the level information of each pixel of said extracted region of the screen; and a communication part for transmitting position information of said region of the screen and said compressed level information.

The invention according to claim 2 is a transmission apparatus for video information characterized by having: an input part for inputting video information transmitted by a central processing unit; a level information generation part for generating level information of each pixel on a screen based on, at least, said video information; a memory part for storing level information of each pixel of the entire region of the screen; a comparison part for comparing level information stored in said memory part with level information outputted by said level information generation part with respect to said pixel associated with said video information and for outputting comparison information; a region extraction part for extracting a region that includes a pixel wherein the level information stored in said memory part and the level information based on said video information are different according to said comparison information; an update region level information generation part for generating differential information between the level information stored in said memory part and the level information outputted by said level information generation part with respect to each pixel of said extracted region of the screen; a compression part for compressing the information amount of said differential information; and a communication part for transmitting position information of said region of the screen and said compressed differential information. The invention according to claim 3 is a transmission apparatus for video information according to claim 1 or 2 characterized in that said communication part is a wireless communication part.

The invention according to claim 4 is a transmission apparatus for video information according to claim 1 or 2 further characterized in that: said update region level information generation part outputs level information of each pixel of the entire region of the screen at least once or more for a constant period of time; said compression part compresses the information amount of the level information of said entire region of the screen; and said communication part transmits identification information for identifying said compressed level information of the entire region of the screen from said compressed level information of the region of the screen or said compressed differential information, as well as said compressed level information of the entire region of the screen.

The invention according to claim 5 is a transmission system for video information characterized by having: a first terminal apparatus that includes a central processing unit and a transmission apparatus for video information according to claim 1; and a second terminal apparatus, wherein said second terminal apparatus has: a communication part for receiving said position information of the region of the screen and said compressed level information; an expansion part for expanding said compressed level information and for outputting level information of each pixel of the extracted region of the screen; a memory part for storing level information of each pixel of the entire region of the screen and for storing the level information of each pixel outputted by said expansion part according to said position information of the region of the screen; and a display part for displaying a screen according to level information of each pixel stored in said memory part.

The invention according to claim 6 is a transmission system for video information characterized by having: a first terminal apparatus that includes a central processing unit and a transmission apparatus for video information according to claim 2; and a second terminal apparatus, wherein said second terminal apparatus has: a communication part for receiving said position information of the region of the screen and said compressed differential information; an expansion part for expanding said compressed differential information and for generating differential information of each pixel of the extracted region of the screen; a memory part for storing the level information of each pixel of the entire region of the screen and for storing the level information of each pixel generated by the level information generation part according to position information of said region of the screen; said level information generation part for generating the level information of each pixel based on the differential information of each pixel generated by said expansion part and level information of each pixel stored in said memory part; and a display part for displaying a screen according to the level information of each pixel stored in said memory part.

The invention according to claim 7 is a transmission system for video information according to claim 5 or 6 characterized in that said communication parts of said first terminal apparatus and said second terminal apparatus are wireless communication parts, respectively.

The invention according to claim 8 is a transmission method for video information characterized by having: an input step for inputting video information transmitted by a central processing unit; a level information generation step for generating the level information of each pixel on a screen based on, at least, said video information; a comparison step for comparing level information stored in a memory part with level information generated in said level information generation step in respect to said pixel associated with said video information and for generating comparison information; a region extraction step for extracting a region that includes a pixel wherein the level information stored in said memory part and the level information based on said video information are different according to said comparison information; a compression step for compressing the information amount of the level information of each pixel of said extracted region of the screen; and a communication step for transmitting position information of said region of the screen and said compressed level information.

The invention according to claim 9 is a transmission method for video information characterized by having: an input step for inputting video information transmitted by a central processing unit; a level information generation step for generating level information of each pixel on the screen based on, at least, said video information; a comparison step for comparing the level information stored in a memory part with the level information generated in said level information generation step with respect to said pixel associated with said video information and for generating comparison information; a region extraction step for extracting a region which includes a pixel wherein the level information stored in said memory and the level information based on said video information are different according to said comparison information; an update region level information generation step for generating differential information between the level information stored in said memory part and the level information generated in said level information generation step with respect to each pixel of said extracted region of the screen; a compression step for compressing the information amount of said differential information; and a communication step for transmitting position information of said region of the screen and said compressed differential information.

The invention according to claim 10 is a transmission method for video information according to claim 8 or 9 characterized in that a wireless communication is carried out in said communication step.

The invention according to claim 11 is a transmission method for video information according to claim 8 or 9 characterized by further having: an entire region level information generation step for reading out the level information of each pixel of the entire region of the screen from said memory part with a frequency of, at least, once or more in a constant period of time; an entire region level information compression step for compressing the information amount of the level information of the entire region of the screen; and an entire region level information transmission step for transmitting identification information for identifying said compressed level information of the entire region of the screen from said compressed level information of the region of the screen or said compressed differential information, as well as said compressed level information of the entire region of the screen.

The invention according to claim 12 is a transmission method for video information characterized by having: each step of the transmission method for video information according to claim 8; a communication step for receiving position information of said region of the screen and said compressed level information; an expansion step for expanding said compressed level information and for outputting the level information of each pixel of the extracted region of the screen; a memory step for storing the level information of each pixel generated in the expansion step according to the position information of said region of the screen; and a display step for displaying a screen according to the level information of each pixel stored in said memory part.

The invention according to claim 13 is a transmission method for video information characterized by having: each step of the transmission method for video information according to claim 9; a reception step for receiving position information of said region of the screen and said compressed differential information; an expansion step for expanding said compressed differential information and for generating differential information of each pixel of the extracted region of the screen; a level information generation step for generating the level information of each pixel based on the differential information of each pixel generated in said expansion step and the level information of each pixel stored in the memory part; a memory step for storing the level information of each pixel generated in said level information generation step in said memory part according to the position information of said region of the screen; and a display step for displaying a screen according to the level information of each pixel stored in said memory part.

The invention according to claim 14 is a transmission method for video information according to claim 12 or 13 characterized in that said transmission step and said reception step are carried out by means of a wireless communication.

According to the present invention, all of the video information is not transmitted but, rather, only information of the part where video data have changed is transmitted. In addition, by utilizing differential information of data (difference between previous data and current data), the amount of the transmitted information can be further reduced.

The present invention has the effect that a transmission apparatus for video information, a transmission system for video information and a transmission method for video information that make the transmission (particularly transmission by means of wireless communication) of video information at a low bit rate possible regardless of differences in OSs can be implemented.

Though the new characteristics of the invention are nothing other than what are specifically described in the attached claims, the present invention will be better understood and appreciated, concerning both the configuration and contents, with reference to the detailed description below which is to be understood in conjunction with the drawings, together with other purposes and characteristics.

It should be taken into consideration that part or the entirety of the drawings are presented in a schematic expression for the purpose of illustration and they do not necessarily faithfully depict the actual comparative dimensions or locations of the elements shown therein.

DETAILED DESCRIPTION OF THE INVENTION

In the following, embodiments which concretely show the best mode for carrying out the present invention are described together with the drawings.

Embodiment 1

In reference to FIGS. 1 to 5 and 10, a transmission apparatus for video information, a transmission system for video information and a transmission method for video information of Embodiment 1 are described.

Figure 10:
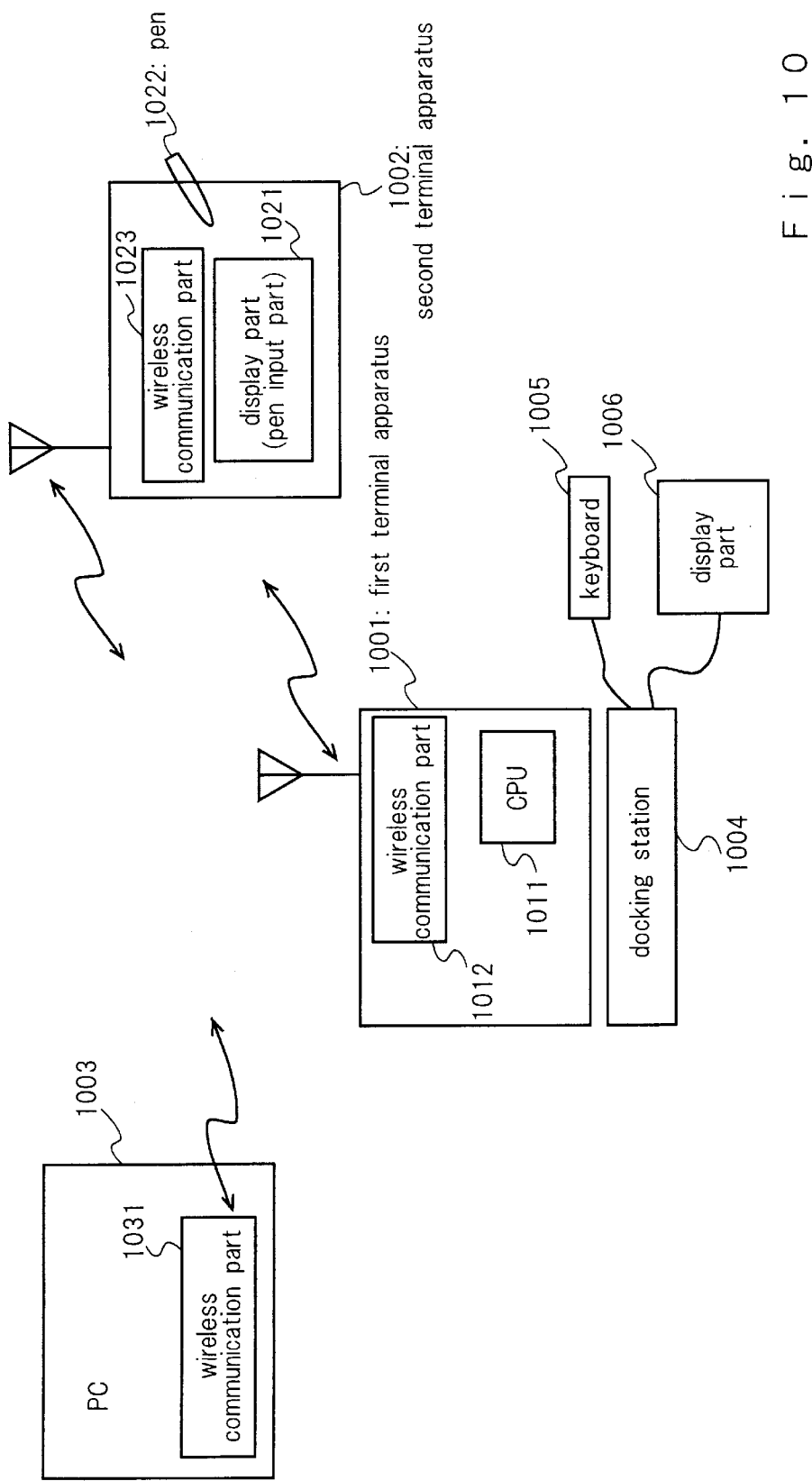
FIG. 10 is a conceptual diagram of a computer that has the first terminal apparatus and the second terminal apparatus.
Figure 11:
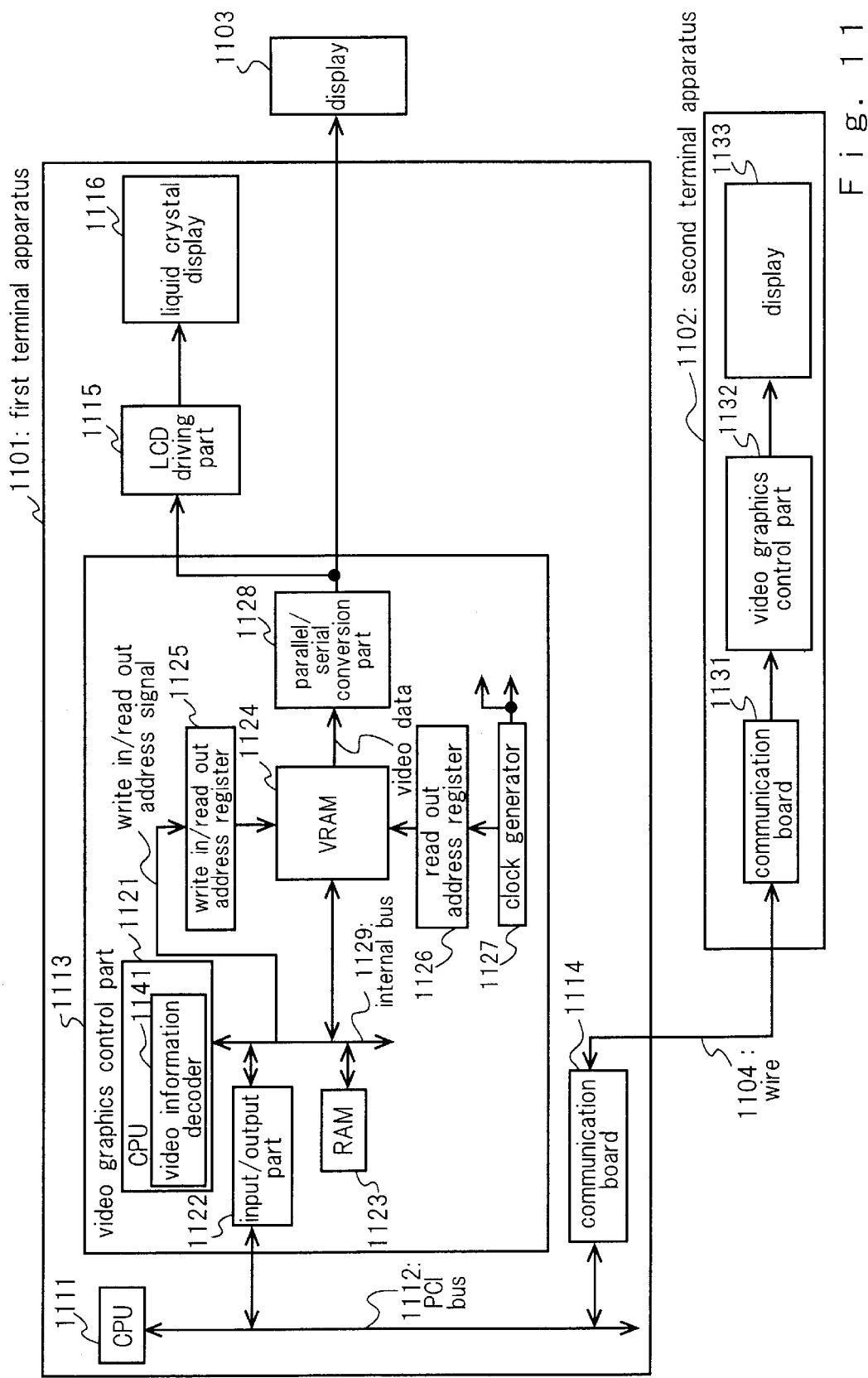
FIG. 11 is a block diagram of a conventional computer that has the first terminal apparatus and the second terminal apparatus.
Figure 12:
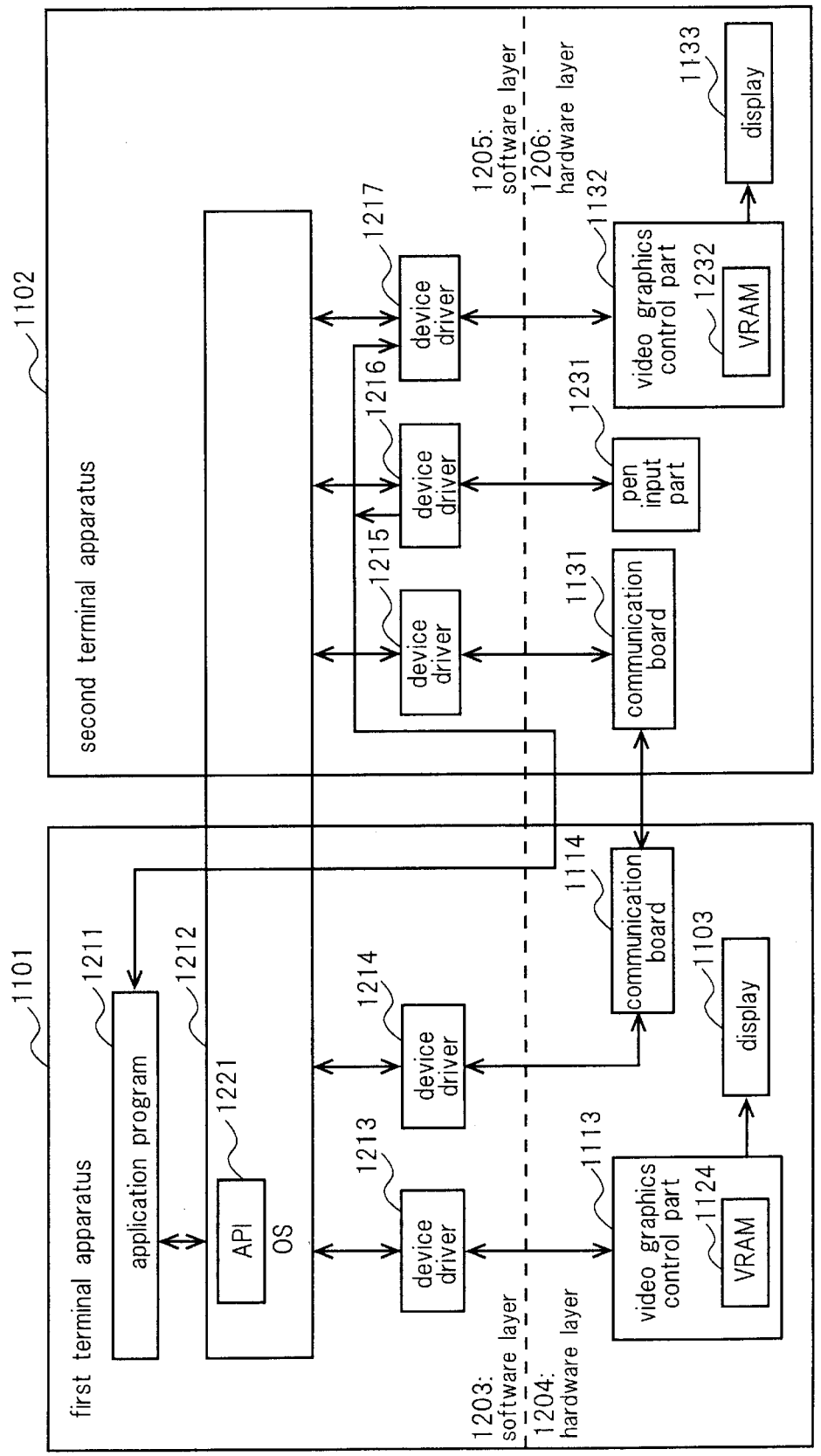
FIG. 12 is a diagram schematically showing the hierarchical structure of a conventional computer which has the first terminal apparatus and the second terminal apparatus.

FIG. 10 is a conceptual diagram of a computer which has a first terminal apparatus and a second terminal apparatus. FIG. 10 is already described in the prior art. FIG. 10 shows one example of a conceptual diagram of a computer that has the first terminal apparatus and the second terminal apparatus in order to facilitate the understanding of the present invention and the object of the application of the present invention is not limited to a computer that has the configuration of FIG. 10.

Figure 1:
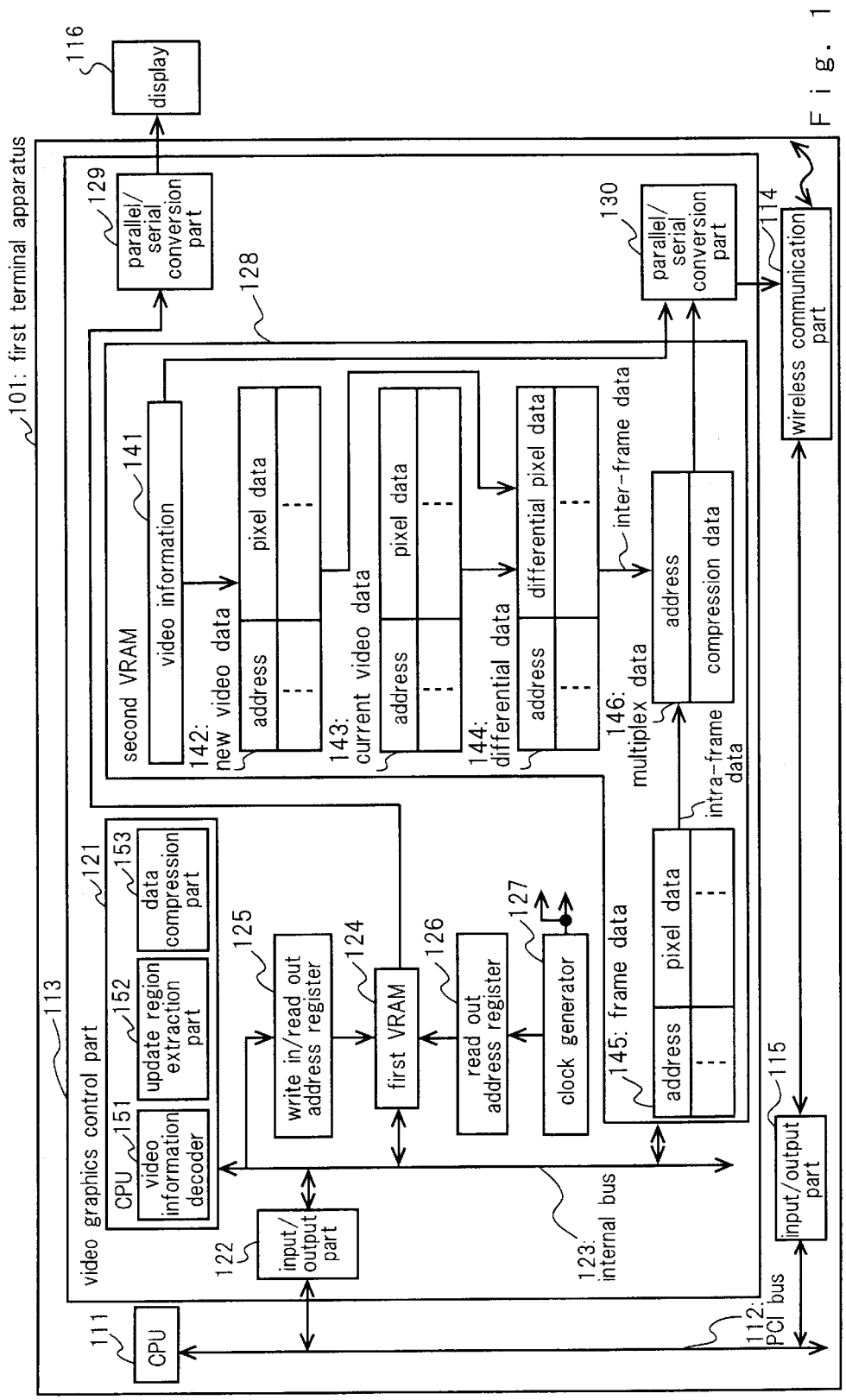
FIG. 1 is a block diagram of the first terminal apparatus in the computer of Embodiment 1.
Figure 2:
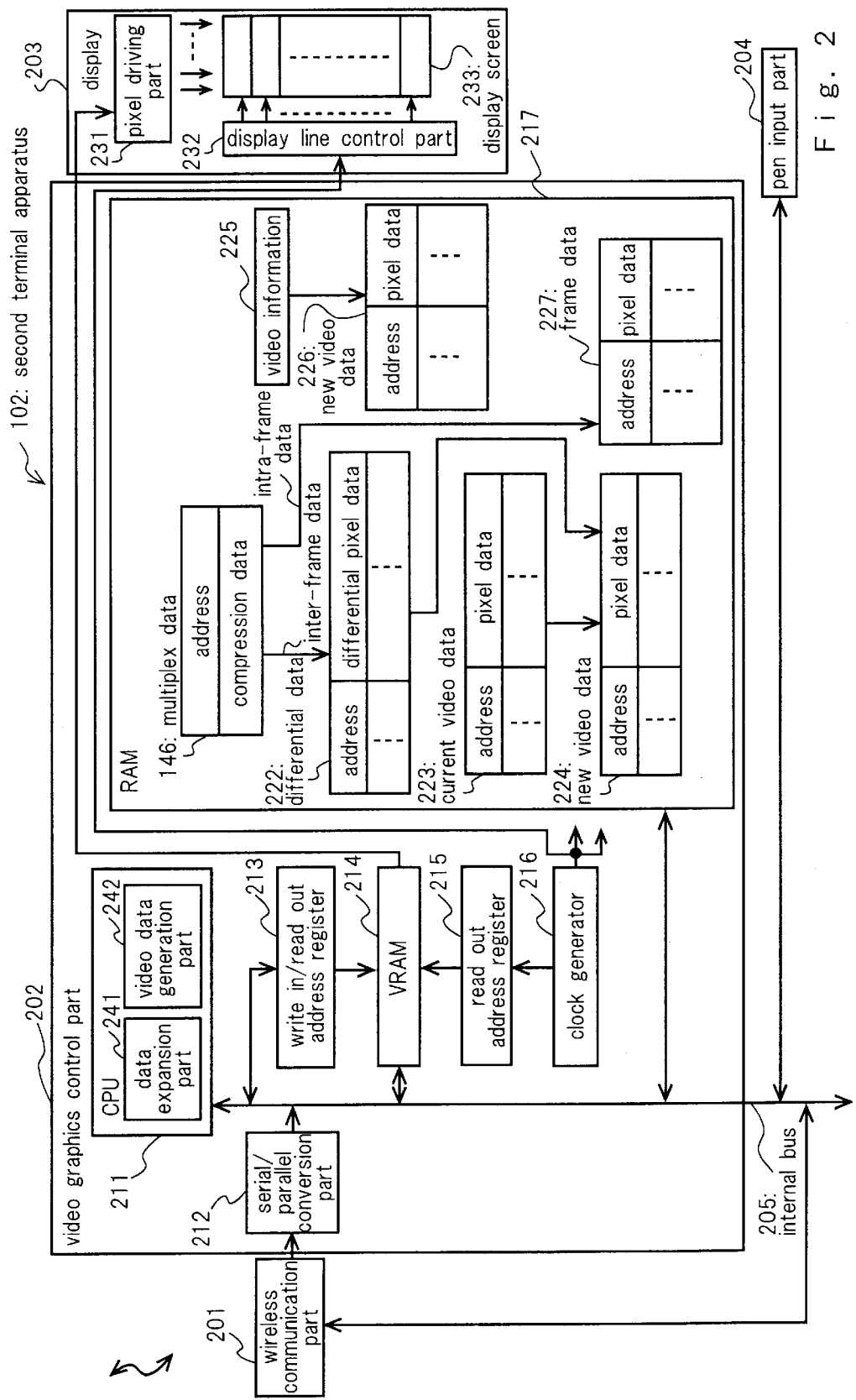
FIG. 2 is a block diagram of the second terminal apparatus in the computer of Embodiment 1.

Description of Transmission Apparatus for Video Information and Transmission System for Video Information In reference to FIGS. 1 and 2, the configurations of a transmission apparatus for video information and a transmission system for video information included in the computer of Embodiment 1 of the present invention which has the first terminal apparatus and the second terminal apparatus are described.

FIG. 1 is a block diagram of the first terminal apparatus 101 in the computer of Embodiment 1 of the present invention which has the first terminal apparatus and the second terminal apparatus (primarily showing the transmission apparatus for video information and the transmission system for video information included in the computer).

In FIG. 1, the first terminal apparatus 101 has a CPU 111, a video graphics control part 113, a wireless communication part 114 and an input/output part 115. An external display 116 can be connected to the first terminal apparatus 101.

In FIG. 1, the descriptions of a ROM, a RAM, and the like, which do not directly relate to the present invention, are omitted though they are indispensable to a computer.

The CPU 111, the video graphics control part 113 and the input/output part 115 are connected to each other via the PCI bus 112.

The video graphics control part 113 has a CPU 121, an input/output part 122, a first VRAM 124, a write in/read out address register 125, a read out address register 126, a clock generator 127, a second VRAM 128, and a parallel/serial conversion parts 129 and 130.

The CPU 121, the input/output part 122, the first VRAM 124, the write in/read out address register 125, the second VRAM 128 and the like are connected to each other via an internal bus 123.

The CPU 121 has a video information decoder 151, an update region extraction part 152 and a data compression part 153. The video information decoder 151 or the like is a execution program of the software.

The CPU 111 transmits video change instructions, described in a software language (for example, DirectX) to the video graphics control part 113 via the PCI bus 112.

The input/output part 122 of the video graphics control part 113 transmits the inputted video change instructions described in a software language to the CPU 121 via the internal bus 123. The input/output part 122 is included as the input part according to the claims.

The CPU 121 converts the video change instructions (video information) described in a software language (program arranged on the Application Programming Interface of the OS of the computer) into the level information of each pixel (for example, information concerning the value to which video data of any address (pixel) of the first VRAM are converted) at the hardware level by utilizing the video information decoder 151.

The second VRAM 128 temporarily stores level information (referred to as "video data") or the like of each pixel generated by the CPU 121 through the utilization of the video information decoder 151, the update region extraction part 152 and the data compression part 153. The second VRAM 128 is a dual port RAM for video display that has a port which can randomly access an arbitrary address and which can write in or read out (addresses designated by the write in/read out address register (not shown)) and a port which can read out the data of each address of an arbitrary region at a high rate and in a constant order (addresses designated by the read out address register (not shown)).

The first VRAM 124 is a dual port RAM for video display that has a port which can randomly access an arbitrary address and which can write in or read out (addresses designated by the write in/read out address register 125) and a port which can read out the data of each address at a high rate and in a constant order (addresses designated by the read out address register 126). The level information of each pixel of the entire screen (level information of each of the sub-pixels RGB), attribute data and the like are stored in the first VRAM 124. The first VRAM 124 is included as a memory part according to the claims.

The second VRAM 128 forms a part of the first VRAM 124 in many video graphics control parts. In this case, the VRAM has a display area and a non-display area, and the display area corresponds to the first VRAM 124 of FIG. 1 while the non-display area corresponds to the second VRAM 128 of FIG. 1.

The video information decoder 151 of the CPU 121 stores the video information 141 described in a software language in the second VRAM 128. The video information decoder 151 decodes the video information 141 and generates new video data (level information of each pixel) 142. The new video data 142 are the data concretely showing new pixel data (level information) for each pixel (address) at the hardware level. The new video data 142 are the data of the pixels of a region which includes pixels associated with the video information 141. The video information decoder 151 is included as the level information generation part according to the claims.

Next, the update region extraction part 152 of the CPU 121 is started up. The update region extraction part 152 reads out the current data of each pixel that are in the same region as the region related to the new video data 142 from the first VRAM 124 and then stores them in the second VRAM 128 (current video data 143). The current video data 143 are the data concretely showing the current pixel data (level information) for each pixel (address) at the hardware level.

Next, the update region extraction part 152 subtracts the current level information from the new level information for each pixel so as to generate differential information for each pixel (differential data 144). The differential data 144 are the data concretely showing differential data for each pixel (address) at the hardware level. The differential data 144 are referred to as inter-frame data so as to be distinguished from the intra-frame data (frame data) which will be described later. The update region extraction part 152 is included as the update region level information generation part according to the claims.

Next, the update region extraction part 152 extracts a region including a pixel whose differential data 144 is not 0. The update region extraction part 152 is also included as the comparison part and as the region extraction part according to the claims. For example, in the case that the new video data 142 and the current video data 143 are the same when it is judged with respect to a particular pixel, the video data of this pixel need not be transmitted to the second terminal apparatus. The update region extraction part 152 extracts an arbitrary region including a pixel whose differential data are not 0. It is preferable for the extracted region to have a shape that can be defined by a small amount of address information. For example, the update region extraction part 152 extracts a minimum rectangular region including a pixel whose differential data 144 are not 0.

Next, the data compression part 153 of the CPU 121 is started up. The data compression part 153 compresses the information amount of the differential data of each pixel in the region extracted by the update region extraction part 152. The data compression part 153 is included as the compression part according to the claims. Next, the data compression part 153 generates multiplex data 146 by multiplexing the compressed data and an address which defines the extracted region. The address which defines the extracted region is, for example, an address at the upper left corner and an address at the lower right corner of the rectangular region (expressed as a region on the screen).

Next, the CPU 121 sets an address in the write in/read out address register 125 so as to write the new video data 142 into an appropriate region of the first VRAM 124.

The clock generator 127 sets the read out address register 126. Generally, the set value of the address register 126 is incremented at an extremely high rate. The video data of the address designated by the address register 126 (video data stored in the first VRAM 124) are read out and transferred to the parallel/serial conversion part 129. The parallel/serial conversion part 129 converts the inputted video data of each address into serial data, which are outputted.

The output signal of the parallel/serial conversion part 129 is transmitted to the external display 116. The display 116 displays the video based on serial data (level information of each pixel).

The CPU 121 sets the region of the second VRAM 128, wherein the multiplex data 146 are stored, in the read out address register of the second VRAM 128. The read out address register of the second VRAM 128 inputs a clock of the clock generator 127 and increments the read out address within the set region. The multiplex data 146 are read out at a high rate from the second VRAM 128.

The read out multiplex data 146 are inputted to the parallel/serial conversion part 130.

The parallel/serial conversion part 130 inputs the multiplex data 146 and converts them into a serial signal so as to be outputted.

The wireless communication part 114 inputs the output signal of the parallel/serial conversion part 130 and transmits it in a wireless manner. The wireless communication part 114 is included as the communication part according to the claims.

In comparison with the transmission of the entirety of the data of each pixel of the entire screen stored in the first VRAM 124 without change, the information amount transmitted in a wireless manner in the transmission system for video information of Embodiment 1 is far smaller. Accordingly, the transmission of video information in a wireless manner becomes possible.

The wireless communication part 114 receives the information transmitted from the second terminal apparatus (instructions or the like by means of pen input), which is transmitted to the input/output part 115. The input/output part 115 transmits the information, which has been transmitted from the second terminal apparatus, to the CPU 111 through the PCI bus 112.

The CPU 121 starts up a forwarding mode of frame data at constant intervals of time. In the forwarding mode of the frame data, the level information of each pixel of the entire screen recorded in the first VRAM 124 is forwarded to the second VRAM 128 (frame data 145). The frame data 145 are the data concretely showing the pixel data (level information) for each pixel (address) of the entire screen at the hardware level. The frame data 145 are referred to as intra-frame data in order to be distinguished from the differential data 144.

The data compression part 153 of the CPU 121 compresses the information amount of the frame data 145. The data compression part 153 of the CPU 121 multiplexes the compressed data and the identification information which shows the transmission of the frame data so as to generate multiplex data 146. The multiplex data 146 are converted into serial data by the parallel/serial conversion part 130 and are transmitted from the wireless communication part 114.

FIG. 2 is a block diagram of the second terminal apparatus 102 in the computer of Embodiment 1 of the present invention which has the first terminal apparatus and the second terminal apparatus (primarily showing a transmission apparatus for video information and a transmission system for video information included in the computer).

In FIG. 2, the second terminal apparatus 102 has a wireless communication part 201, a video graphics control part 202, a display 203 (display part) and a pen input part 204.

The video graphics control part 202 has a CPU 211, a serial/parallel conversion part 212, a write in/read out address register 213, a VRAM 214, a read out address register 215, a clock generator 216 and a RAM 217.

The wireless communication part 201, the video graphics control part 202 (the CPU 211, the serial/parallel conversion part 212, the write in/read out address register 213, the VRAM 214 and the RAM 217) and the pen input part 204 are connected to each other via the internal bus 205.

The display 203 has a pixel driving part 231, a display line control part 232 and a display screen 233 that includes a large number of pixels.

The CPU 211 has a data expansion part 241 and a video data generation part 242. The data expansion part 241 or the like are the execution programs of the software.

The wireless communication part 201 receives the serial signal transmitted by the wireless communication part 114 of the first terminal apparatus 101. The wireless communication part 201 is included as the communication part according to the claims. The serial/parallel conversion part 212 converts the serial signal received by the wireless communication part 201 into a parallel signal, which is then outputted.

The CPU 211 stores the output signal of the serial/parallel conversion part 212 in the RAM 217 (multiplex data 146).

The data expansion part 241 of the CPU 211 is started up. The data expansion part 241 separates the multiplex data 146 into address information and compressed data, and expands the compressed data so as to generate the differential data 222 (in the case that the differential data are transmitted). The data expansion part 241 is included as the expansion part according to the claims.

Next, the video data generation part 242 of the CPU 211 is started up. The video data generation part 242 reads out the current video data (level information) 223 of each pixel in the region to which the differential data is transmitted from the VRAM 214 and then stores them in the RAM 217. The video data generation part 242 adds the differential data and the current video data for each pixel so as to generate new video data 224. The video data generation part 242 is included as the level information generation part according to the claims.

The video data generation part 242 stores the new video data 224 in an appropriate region (region defined by address information included in the multiplex data 146) of the VRAM 214.

The VRAM 214 is a dual port RAM which has a configuration similar to that of the first VRAM 124. The VRAM 214 is included as the memory part according to the claims.

The clock generator 216 sets the read out address register 215. Generally, the set value of the address register 215 is incremented at an extremely high rate. Information (information stored in the VRAM 214) of the address designated by the read out address register 215 is read out and is transferred to the pixel driving part 231 of the display 203. When data (level information of each pixel) for one row are accumulated in the pixel driving part 231, the pixels of the row designated by the display line control part 232 are displayed. The display line control part 232 inputs a clock outputted by the clock generation part 216 so as to operates. By sequentially displaying pixels in each line, the display screen 233 displays the video information as the whole.

The display 203 is included as the display part according to the claims.

In the case that the transmitted multiplex data 146 are frame data (video data for one entire frame), the data expansion part 241 recognizes that the multiplex data 146 include the frame data based on the identification information included in the multiplex data 146. The data expansion part 241 separates the compressed data from the multiplex data 146 and generates frame data 227 by expanding the compressed data. The video data generation part 242 stores the frame data 227 in the VRAM 214.

The first terminal apparatus 101 can also transmit video information described in a software language to the second terminal apparatus 102. The CPU 211 of the second terminal apparatus 102 stores the inputted video information 225 in the RAM 217. The video information decoder (not shown) of the CPU 211 is started up and generates new video data 226 (level information of each pixel) by decoding the video information 225. The CPU 211 stores the generated new video data 226 in an appropriate region of the VRAM 214.

The user can input instructions to the computer through the pen input part 204 provided on the display. The CPU 211 transmits the inputted instructions from the pen input part 204 to the wireless communication part 201. The wireless communication part 201 transmits the inputted instructions.

Description of Transmission Method for Video Information

Figure 3:
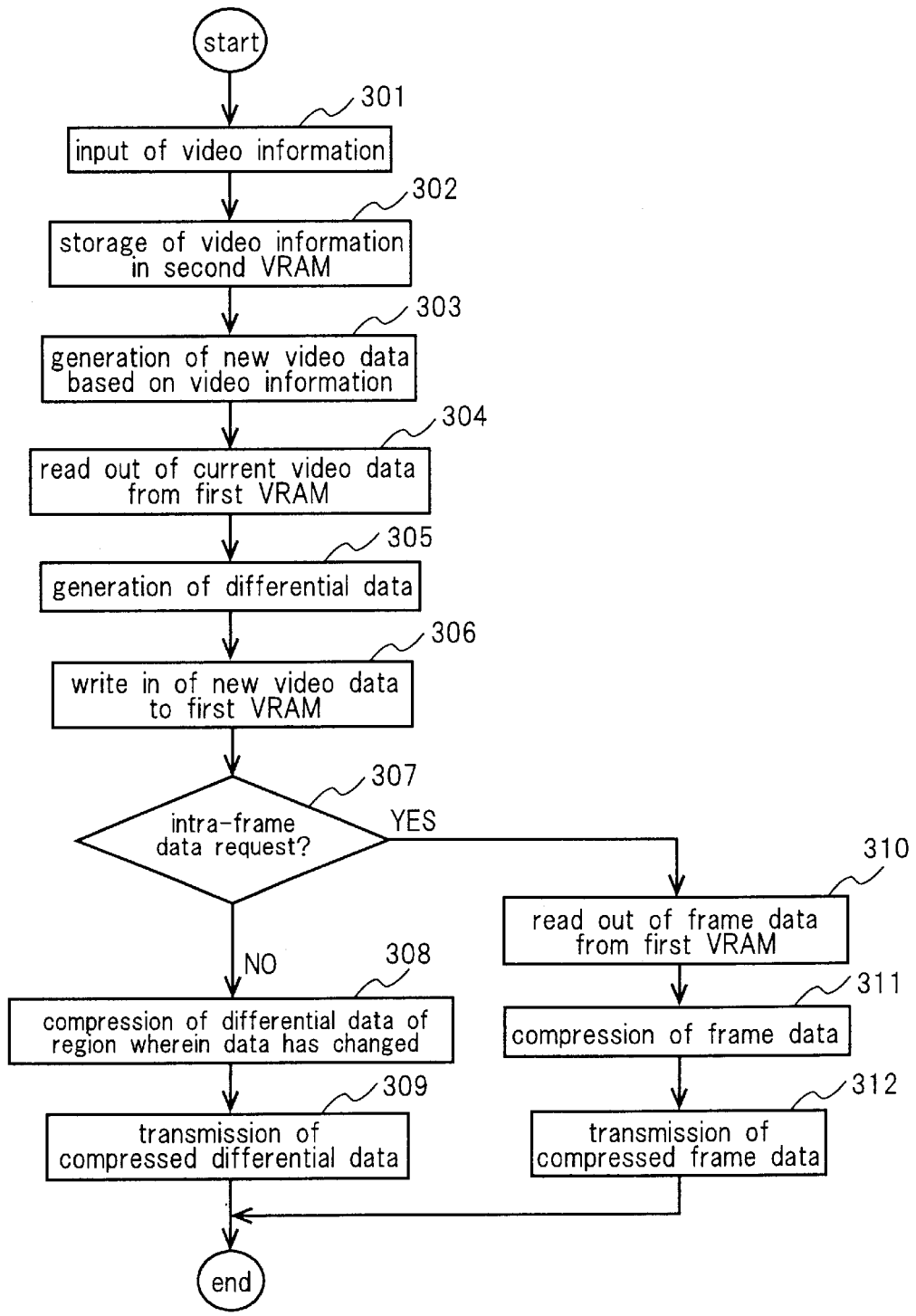
FIG. 3 is a flow chart at the transmission end of the transmission method for video information of Embodiment 1.
Figure 4:
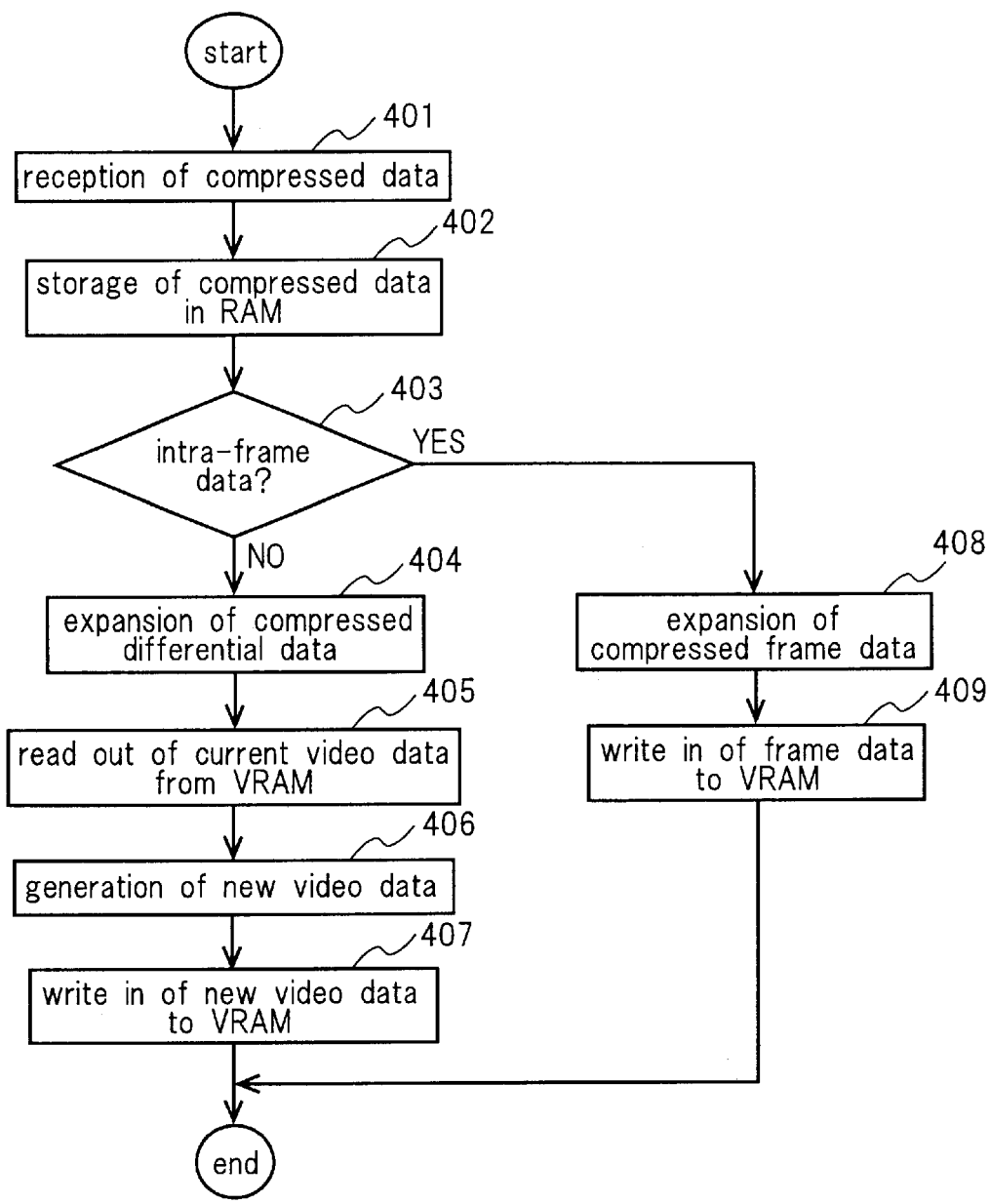
FIG. 4 is a flow chart at the reception end of the transmission method for video information of Embodiment 1.

In reference to FIGS. 3 and 4, the transmission method for video information of Embodiment 1 is described.

FIG. 3 is a flow chart of the transmission end (first terminal apparatus 101) of the transmission method for video information which uses the transmission apparatus or the transmission system of Embodiment 1.

First, the video graphics control part 113 inputs the video information 141 which is generated by the CPU 111 and which is written in a software language (Step 301). Next, the video graphics control part 113 inputs the video information 141 into the second VRAM 128 (Step 302). Next, the video information decoder 151 decodes the inputted video information 141 and generates new video data (level information of each pixel) (Step 303).

Next, the update region extraction part 152 reads out the current video data 143 from the first VRAM 124 and stores them in the second VRAM 128 (Step 304).

Next, the update region extraction part 152 subtracts the current video data from the new video data for each pixel and generates differential data 144 (Step 305).

Next, the update region extraction part 152 writes the new video data 142 into an appropriate region (address corresponding to each pixel of the new video data) of the first VRAM (Step 306).

Next, it is checked whether an intra-frame data transmission request, which occurs at constant intervals of time, has occurred or not (Step 307). In the case that an intra-frame data transmission request has occurred, the procedure proceeds to Step 310 and in the case that an intra-frame data transmission request has not occurred, the procedure proceeds to Step 308.

In Step 308 the differential data (included in the differential data 144) of the region (for example, rectangular region), which includes a pixel of which the differential data are not 0, are extracted and the information amount thereof is compressed. Next, in Step 309, the compressed data and the address information of the extracted region are multiplexed so as to generate multiplex data 146. The multiplex data (including compressed differential data) are transmitted in a wireless manner (Step 309). The procedure is, thus, completed.

In Step 307, in the case that there is an intra-frame data transmission request, Steps 310 to 312 are carried out.

In Step 310, level information (frame data 145) of each pixel for the entirety of the screen is read out from the first VRAM 124, which is stored in the second VRAM 128.

Next, in Step 311, the information amount of the frame data 145 is compressed.

Next, in Step 312, the compressed frame data and identification information, which indicates that these compressed data are frame data, are multiplexed so as to generate multiplex data 146. The multiplex data 146 (including the compressed frame data) are transmitted in a wireless manner.

FIG. 4 is a flow chart of the reception end (second terminal apparatus 102) of the transmission method for video information which uses the transmission apparatus or the transmission system of Embodiment 1.

First, in Step 401, the wireless reception part 201 of the second terminal apparatus 102 receives the multiplex data 146 which include the compressed video data.

The CPU 211 stores the multiplex data 146 (including the compressed data) in the RAM 217 (Step 402).

Next, the multiplex data are separated into address information and compressed data.

Whether or not the multiplex data include identification information which indicates that the compressed data are intra-frame data is checked (Step 403). In the case that the identification information which indicates that the compressed data are intra-frame data is included, the procedure proceeds to Step 408 and in the case that the identification information which indicates that the compressed data are intra-frame data is not included, the procedure proceeds to Step 404.

In the case that the compressed data are differential data, Steps 404 to 407 are carried out. In Step 404 the data expansion part 241 of the CPU 211 expands the compressed data and generates the expanded differential data 222.

Next, the video data generation part 242 of the CPU 211 reads out the current video data from the VRAM 214, which are then stored in the RAM 217 (current video data 223) (Step 405). Next, the video data generation part 242 adds the current video data to the differential data for each pixel so as to generate new video data 224 (Step 406). Next, the video data generation part 242 stores the new video data 224 in the VRAM 214 (Step 407). Video data of each pixel are read out from the VRAM 214 and are then displayed on the display 203.

In the case that the compressed data are intra-frame data, Steps 408 to 409 are carried out. In Step 408, the data expansion part 241 of the CPU 211 expands the compressed data and generates the expanded frame data 227. Next, the video data generation part 242 stores the frame data 227 in the VRAM 214 (Step 409). Video data of each pixel are read out from the VRAM 214 and are then displayed on the display 203.

Figure 5:
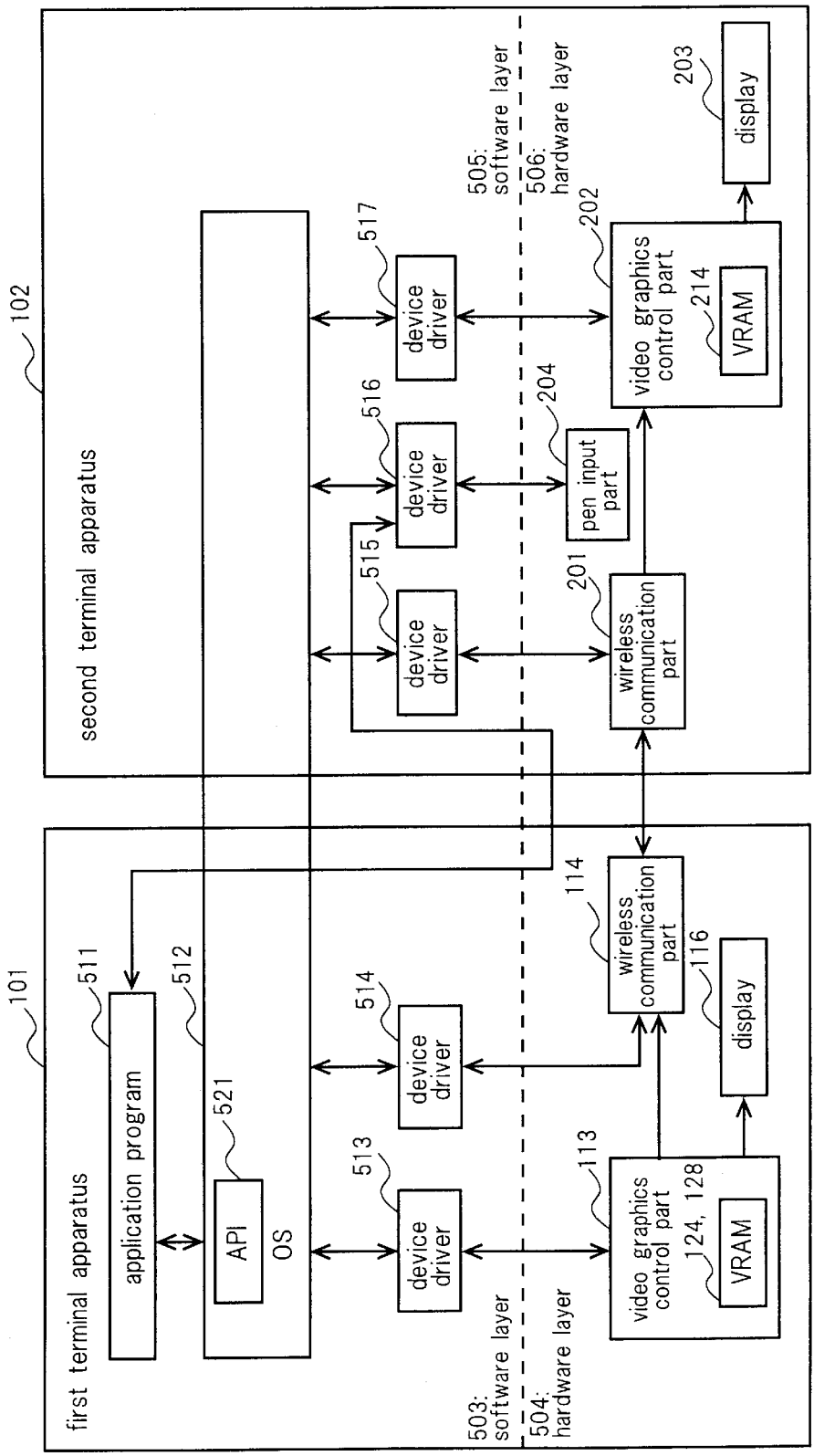
FIG. 5 is a diagram schematically showing the hierarchical structure of the computer of an embodiment that has the first terminal apparatus and the second terminal apparatus.

FIG. 5 schematically shows the hierarchical structure of the computer of Embodiment 1 which has the first terminal apparatus 101 and the second terminal apparatus 102.

The first terminal apparatus 101 has a software layer 503 which is the upper layer and a hardware layer 504 which is the lower layer. The software layer 503 has an application program 511, an OS (Operating System) 512, and device drivers 513 and 514. The hardware layer 504 has a video graphics control part 113 (including VRAMs 124 and 128), a display 116 and a wireless communication part 114. The application program 511 operates on the OS 512 and the device drivers 513 and 514 depend on the OS 512.

The video graphics control part 113 is controlled by the device driver 513 while the wireless communication part 114 is controlled by the device driver 514.

The second terminal apparatus 102 has a software layer 505 which is the upper layer and a hardware layer 506 which is a lower layer. The software layer 505 has device drivers 515, 516 and 517 that depend on the OS 512, which is stored in the first terminal apparatus. The hardware layer 506 has a wireless communication part 201, a pen input part 204, a video graphics control part 202 (including a VRAM 214) and a display 203. The device drivers 515, 516 and 517 communicate with the OS 512 via the wireless communication parts 114 and 201.

The video graphics control part 202 is controlled by the device driver 517, the pen input part 204 is controlled by the device driver 516 and the wireless communication part 201 is controlled by the device driver 515.

The user can input the video information (arbitrary information concerning the video drawing) described in the software language by using an application program 511 (for example, DirectX) located on the OS 512. This video change information is transmitted to the OS 512 (OS 512 operates on the CPU 111) through the API 521 (Application Programming Interface, which is included in OS). The OS 512 transmits this video information to the device driver 513. The device driver 513 generates level information of each pixel based on this video information so as to store the level information of each pixel in the first VRAM 124 and in the second VRAM 128. The level information of each pixel stored in the first VRAM 124 is read out by a hardware circuit (clock generation circuit 127 and the like) and is then displayed on the display 116.

In addition, the level information of each pixel (data at the hardware level) stored in the second VRAM 128 is transmitted to the video graphics control part 202 of the second terminal apparatus via the wireless communication parts 114 and 201. The video graphics control part 202 stores level information of each pixel in the VRAM 214. The level information of each pixel stored in the VRAM 214 is read out by the hardware circuit (clock generation circuit and the like) and is then displayed on the display 203.

The video data are transmitted from the first terminal apparatus 101 to the second terminal apparatus 102 as data at the hardware level and, therefore, even in the case that the OS of the first terminal apparatus 101 and the OS which the device driver of the second terminal apparatus depends on are different, the transmission of the video data from the first terminal apparatus 101 to the second terminal apparatus is possible. The compression and the expansion of the video data are carried out by software in the first terminal apparatus 101 and the second terminal apparatus, respectively. However, only the compressed data are transmitted from the first terminal apparatus 101 to the second terminal apparatus and no commands described in a software language are transmitted and, therefore, the OS of the first terminal apparatus 101 and the OS of the second terminal apparatus need not be the same as long as the data compression and expansion are in correspondence with each other.

The user can input instruction to the computer (assumed to be video change instructions) from the pen input part 204 of the hardware layer 506. The video change instruction inputted by the user is converted into information (video change instruction information) in the software by the device driver 516. The video change instruction information is transmitted to the OS 512 via the wireless communication parts 201 and 114. The OS 512 transmits this video change instruction information to the application program 511 via the API 521. The application program 511 generates new video information according to this video change instruction information.

In the following the video graphics control parts 113 and 202 output the newly generated level information of each pixel, respectively.

In the transmission apparatus for video information and the transmission system for video information of Embodiment 1, only the video data in the region where the video data have changed are compressed so as to be transmitted and received and, therefore, the necessary video information can be conveyed by means of a transmission of a small information amount.

Even in the system where the OS installed on the first terminal apparatus and the OS which the second terminal apparatus depends on are different, the transmission of video change instructions from the second terminal apparatus to the first terminal apparatus is possible by setting a communication protocol between the first terminal apparatus and the second terminal apparatus in the case that the types of video change instructions which are inputted from the pen input part 204 are restrictive (this is true in many systems).
Embodiment 2

In reference to FIGS. 6 to 10, the transmission apparatus for video information, the transmission system for video information and the transmission method for video information of Embodiment 2 are described.

FIG. 10 is a conceptual diagram of a computer that has the first terminal apparatus and the second terminal apparatus. FIG. 10 has already been described in the prior art. FIG. 10 shows one example of a conceptual diagram of a computer that has the first terminal apparatus and the second terminal apparatus in order to facilitate the understanding of the present invention, and the object of application of the present invention is not limited to the computer that has the configuration of FIG. 10.

Figure 6:
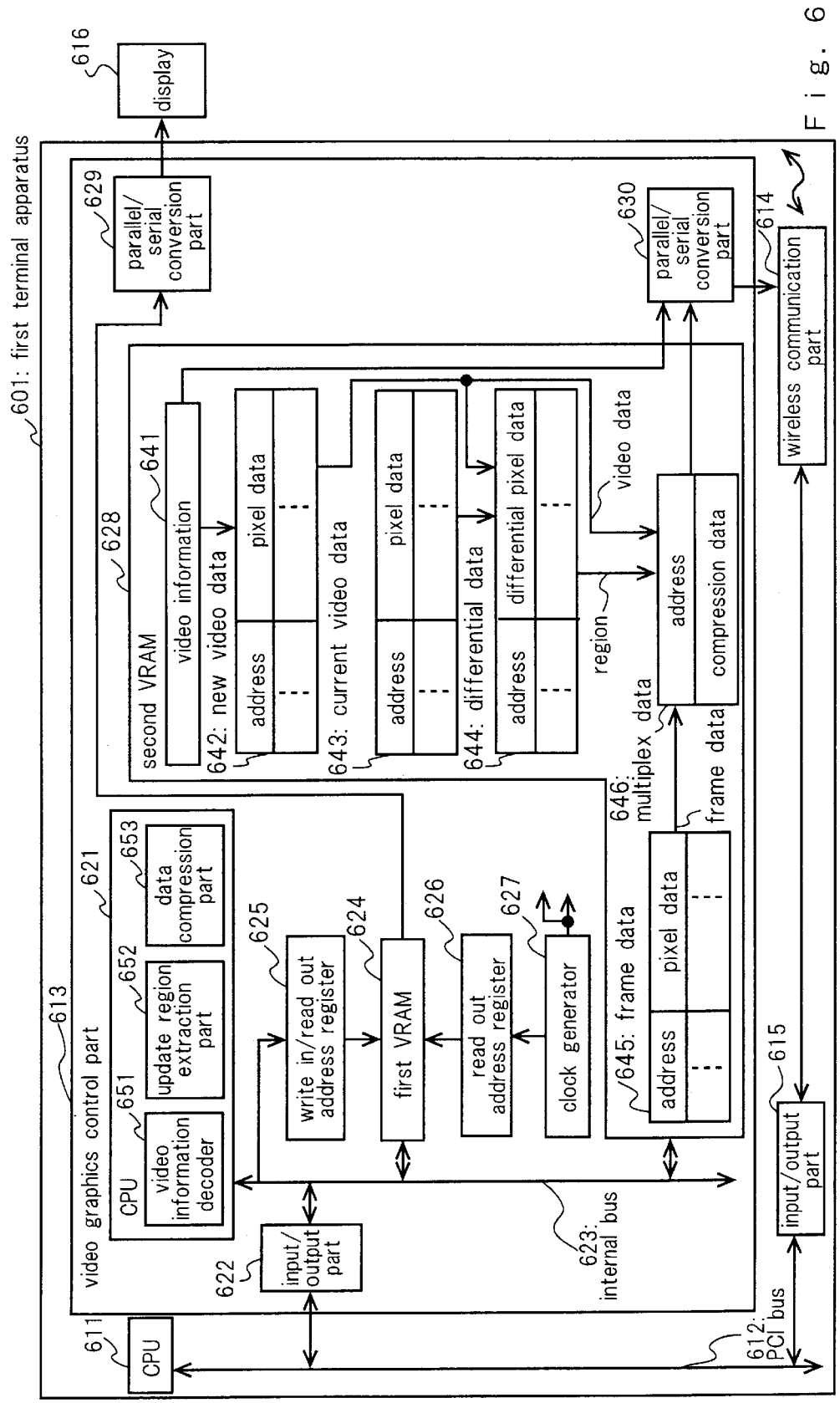
FIG. 6 is a block diagram of the first terminal apparatus in the computer of Embodiment 2.
Figure 7:
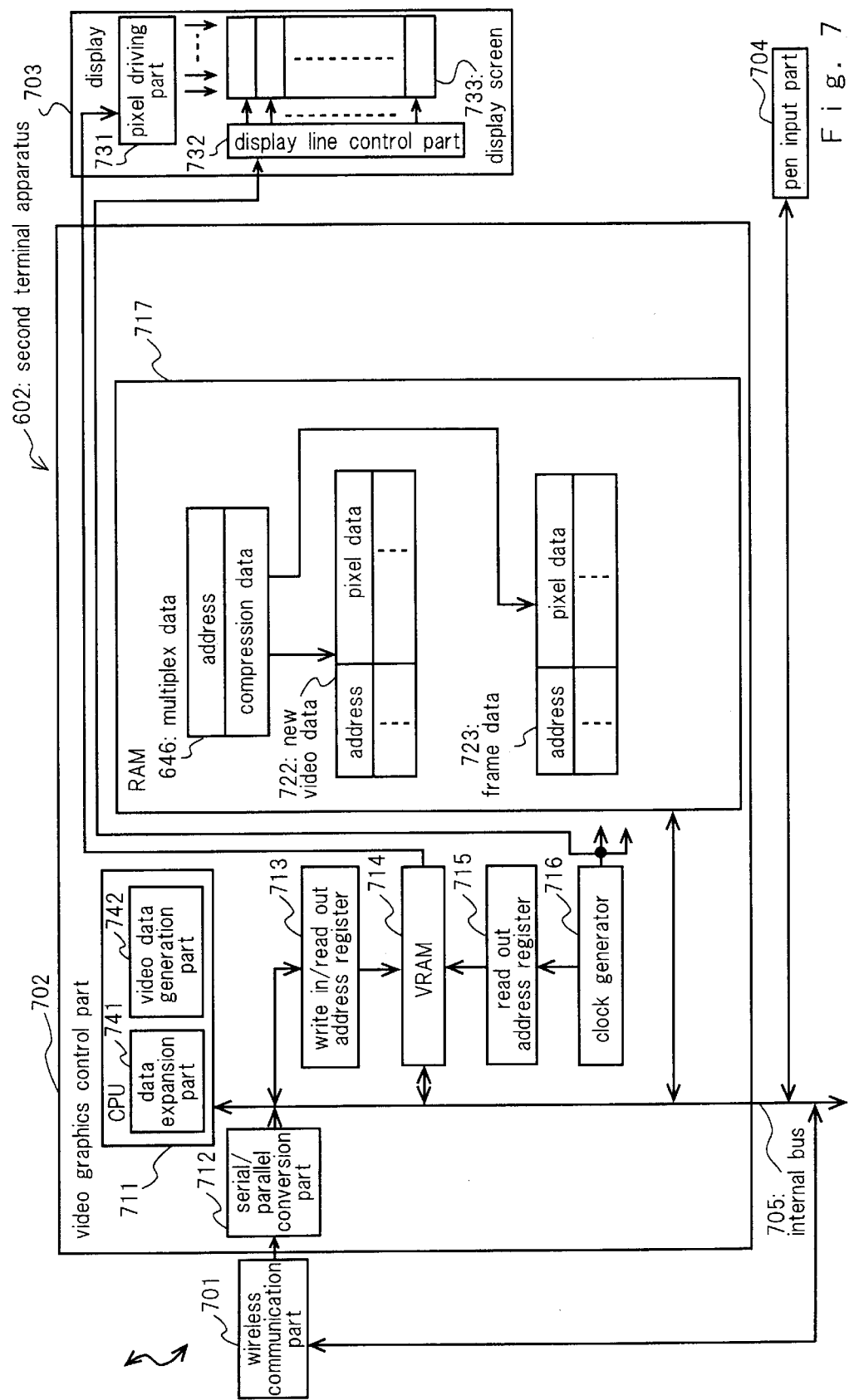
FIG. 7 is a block diagram of the second terminal apparatus in the computer of Embodiment 2.

Description of the Configurations of the Transmission Apparatus for Video Information and the Transmission System for Video Information In reference to FIGS. 6 and 7, the configurations of the transmission apparatus for video information and the transmission system for video information included in the computer of Embodiment 2 of the present invention, which has the first terminal apparatus and the second terminal apparatus, are described.

FIG. 6 is a block diagram of the first terminal apparatus 601 in the computer of Embodiment 2 of the present invention, which has the first terminal apparatus and the second terminal apparatus (primarily showing the transmission apparatus for video information and the transmission system for video information included in the computer).

In FIG. 6, the first terminal apparatus 601 has a CPU 611, a video graphics control part 613, a wireless communication part 614 and an input/output part 615. An external display 616 can be connected to the first terminal apparatus 601.

In FIG. 6, the descriptions of a ROM, a RAM and the like, which do not directly relate to the present invention, are omitted though they are indispensable to a computer.

The CPU 611, the video graphics control part 613 and the input/output part 615 are connected to each other via the PCI bus 612.

The video graphics control part 613 has a CPU 621, an input/output part 622, a first VRAM 624, a write in/read out address register 625, a read out address register 626, a clock generator 627, a second VRAM 628 and parallel/serial conversion parts 629 and 630.

The CPU 621, the input/output part 622, the first VRAM 624, the write in/read out address register 625, the second VRAM 628 and the like are connected to each other via the internal bus 623.

The CPU 621 has a video information decoder 651, an update region extraction part 652 and a data compression part 653. The video information decoder 651 and the like are execution programs of the software.

The CPU 611 transmits video change instructions described in a software language (for example, DirectX) to the video graphics control part 613 via the PCI bus 612.

The input/output part 622 of the video graphics control part 613 transmits the inputted video change instructions described in a software language to the CPU 621 via the internal bus 623. The input/output part 622 is included as the input part according to the claims.

The CPU 621 converts the video change instructions (video information) described in a software language (program arranged on the Application Programming Interface of the OS of this computer) into level information of each pixel at the hardware level (for example, information concerning the value to which video data of any address (pixel) in the first VRAM is changed) by utilizing the video information decoder 651.

Level information of each pixel (referred to as "video data") or the like, which the CPU 621 generates by utilizing the video information decoder 651, the update region extraction part 652 and the data compression part 653, is temporarily stored in the second VRAM 628. The second VRAM 628 is a dual port RAM for video display that has a port which can randomly access an arbitrary address and which can write in or read out (the address is designated by the write in/read out address register (not shown)) and a port which can read out data of each address from an arbitrary region at a high rate and in a constant order (the address is designated by the read out address register (not shown)).

The first VRAM 624 is a dual port RAM for video display that has a port which can randomly access an arbitrary address and which can write in or read out (the address is designated by the write in/read out address register 625) and a port which can read out data of each address at a high rate and in a constant order (the address is designated by the read out address register 626). The level information of each pixel of the entirety of the screen (level information of each of the sub-pixels RGB), attribute data and the like are stored in the first VRAM 624. The first VRAM 624 is included as the memory part according to the claims.

The second VRAM 628 forms a part of the first VRAM 624 in a large number of video graphics control parts. In this case, the VRAM has a display area and a non-display area, and the display area corresponds to the first VRAM 624 of FIG. 6 while the non-display area corresponds to the second VRAM 628 of FIG. 6.

The video information decoder 651 of the CPU 621 stores the video information 641 described in a software language in the second VRAM 628. The video information decoder 651 decodes the video information 641 and generates new video data (level information of each pixel) 642. The new video data 642 are the data concretely showing new pixel data (level information) of each pixel (address) at the hardware level. The new video data 642 are the data of pixels in the region that includes pixels associated with the video information 641. The video information decoder 651 is included as the level information generation part according to the claims.

Next, the update region extraction part 652 of the CPU 621 is started up. The update region extraction part 652 reads out the current data of each pixel in the region, which is the same as the region related to the new video data 642, from the first VRAM 624 and stores the current data in the second VRAM 628 (the current video data 643). The current video data 643 are the data concretely showing the current pixel data (level information) of each pixel (address) at the hardware level.

Next, the update region extraction part 652 subtracts the current level information from the new level information for each pixel and generates differential information of each pixel (differential data 644). The differential data 644 are the data concretely showing the differential data of each pixel (address) at the hardware level.

Next, the update region extraction part 652 extracts a region that includes a pixel of which the differential data 644 are not 0. The update region extraction part 652 is included as the comparison part and the region extraction part according to the claims. For example, in the case that the new video data 642 and the current video data 643 are the same, when judging with respect to a particular pixel, the video data of this pixel do not need to be transmitted to the second terminal apparatus. The update region extraction part 652 extracts an arbitrary region that includes a pixel whose differential data are not 0. It is preferable for the extracted region to be in a form that can be defined with a small amount of address information. For example, the update region extraction part 652 extracts a minimum rectangular region that includes a pixel whose differential data 644 are not 0.

Next, the data compression part 653 of the CPU 621 is started up. The data compression part 653 compresses the information amount of the video data (included in the new video data 642) of each pixel in the region extracted by the update region extraction part 652. The data compression part 653 is included as the compression part according to the claims. Next, the data compression part 653 multiplexes the compressed data and the addresses that define the extracted region so as to generate multiplex data 646. The address which defines the extracted region is, for example, the address at the upper left corner and the address at the lower right corner of the rectangular region (represented by the region on the screen).

Next, the CPU 621 sets an address in the write in/read out address register 625 and writes the new video data 642 into an appropriate region of the first VRAM 624.

The clock generator 627 sets the read out address register 626. Generally, the set value of the address register 626 is incremented at an extremely high rate. The video data of the address designated by the address register 626 (the video data stored in the first VRAM 624) are read out and forwarded to the parallel/serial conversion part 629. The parallel/serial conversion part 629 converts the inputted video data of each address into serial data that are then outputted.

The output signal of the parallel/serial conversion part 629 is transmitted to the external display 616. The display 616 displays the video based on the serial data (level information of each pixel).

The CPU 621 sets the region of the second VRAM 628, in which the multiplex data 646 are stored, in the read out address register of the second VRAM 628. The read out address register of the second VRAM 628 inputs a clock of the clock generator 627 and, thereby, increments the read out address within the set region. The multiplex data 646 are read out at a high rate from the second VRAM 628.

The read out multiplex data 646 are inputted to the parallel/serial conversion part 630.

The parallel/serial conversion part 630 inputs the multiplex data 646 and converts them into a serial signal so as to be outputted.

The wireless communication part 614 inputs the output signal of the parallel/serial conversion part 630 and transmits it in a wireless manner. The wireless communication part 614 is included as the communication part according to the claims.

In comparison with the transmission of the data of each pixel of the entirety of the screen stored in the first VRAM 624 without change, the information amount transmitted in a wireless manner is far smaller in the transmission system for video information of Embodiment 2. Accordingly, the transmission of video information in a wireless manner becomes possible.

The wireless communication part 614 receives information (instructions or the like by means of pen input) transmitted from the second terminal apparatus and transmit it to the input/output part 615. The input/output part 615 transmits the information which has been transmitted from the second terminal apparatus to the CPU 611 through the PCI bus 612.

The CPU 621 starts up a mode for forwarding frame data at constant intervals of time. In the mode for forwarding frame data, the level information of each pixel of the entirety of the screen recorded in the first VRAM 624 is forwarded to the second VRAM 628 (frame data 645). The frame data 645 are the data concretely showing the pixel data (level information) of each pixel (address) of the entirety of the screen at the hardware level.

The data compression part 653 of the CPU 621 compresses the information amount of frame data 645. The data compression part 653 of the CPU 621 multiplexes the compressed data and the identification information that indicates the transmission of frame data so as to generate multiplex data 646. The multiplex data 646 are converted into serial data by the parallel/serial conversion part 630 and are then transmitted from the wireless communication part 614.

FIG. 7 is a block diagram of the second terminal apparatus 602 in the computer of Embodiment 2 of the present invention, which has the first terminal apparatus and the second terminal apparatus (primarily showing a transmission apparatus for video information and a transmission system for video information included in the computer).

In FIG. 7, the second terminal apparatus 602 has a wireless communication part 701, a video graphics control part 702, a display 703 (display part) and a pen input part 704.

The video graphics control part 702 has a CPU 711, a serial/parallel conversion part 712, a write in/read out address register 713, a VRAM 714, a read out address register 715, a clock generator 716 and a RAM 717.

The wireless communication part 701, the video graphics control part 702 (the CPU 711, the serial/parallel conversion part 712, the write in/read out address register 713, the VRAM 714 and the RAM 717) and the pen input part 704 are connected to each other via the internal bus 705.

The display 703 has a pixel driving part 731, a display line control part 732 and a display screen 733 that includes a large number of pixels.

The CPU 711 has a data expansion part 741 and a video data generation part 742. The data expansion part 741 or the like is an execution program of the software.

The wireless communication part 701 receives the serial signal transmitted by the wireless communication part 614 of the first terminal apparatus 601. The wireless communication part 701 is included as the communication part according to the claims. The serial/parallel conversion part 712 converts the serial signal received by the wireless communication part 701 into a parallel signal, which is then outputted.

The CPU 711 stores the output signal of the serial/parallel conversion part 712 in the RAM 717 (multiplex data 646).

The data expansion part 741 of the CPU 711 is started up. The data expansion part 741 separates the multiplex data 646 into address information and compressed data, and expands the compressed data so as to generate new video data 722 of the region extracted by the update region extraction part 652 (in the case that new video data of the extracted region are transmitted). The data expansion part 741 is included in the expansion part according to the claims.

Next, the video data generation part 742 of the CPU 711 is started up. The video data generation part 742 stores the new video data 722 in an appropriate region of the VRAM 714 (the region defined by the address information included in the multiplex data 646).

The VRAM 714 is a dual port RAM that has a configuration similar to the first VRAM 624. The VRAM 714 is included as the memory part according to the claims.

The clock generator 716 sets the read out address register 715. Generally, the set value of the address register 715 is incremented at an extremely high rate. The information of the address designated by the read out address register 715 (information stored in the VRAM 714) is read out and forwarded to the pixel driving part 731 of the display 703. When data (level information of each pixel) for one row are accumulated in the pixel driving part 731, the pixels of the row designated by the display line control part 732 are displayed. The display line control part 732 operates by inputting a clock outputted from the clock generation part 716. By sequentially displaying pixels of each row, the display screen 733 displays the video information as a whole.

The display 703 is included as the display part according to the claims.

In the case that the transmitted multiplex data 646 are frame data (video data of one entire frame), the data expansion part 741 recognizes that the multiplex data 646 include the frame data based on the identification information included in the multiplex data 646. The data expansion part 741 separates the compressed data from the multiplex data 646, and expands the compressed data so as to generate frame data 723. The video data generation part 742 stores the frame data 723 in the VRAM 714.

The user can input instructions to the computer by means of the pen input part 704 provided on the display. The CPU 711 transmits the inputted instructions to the wireless communication part 701 from the pen input part 704. The wireless communication part 701 transmits the inputted instructions.

Description of Transmission Method for Video Information

Figure 8:
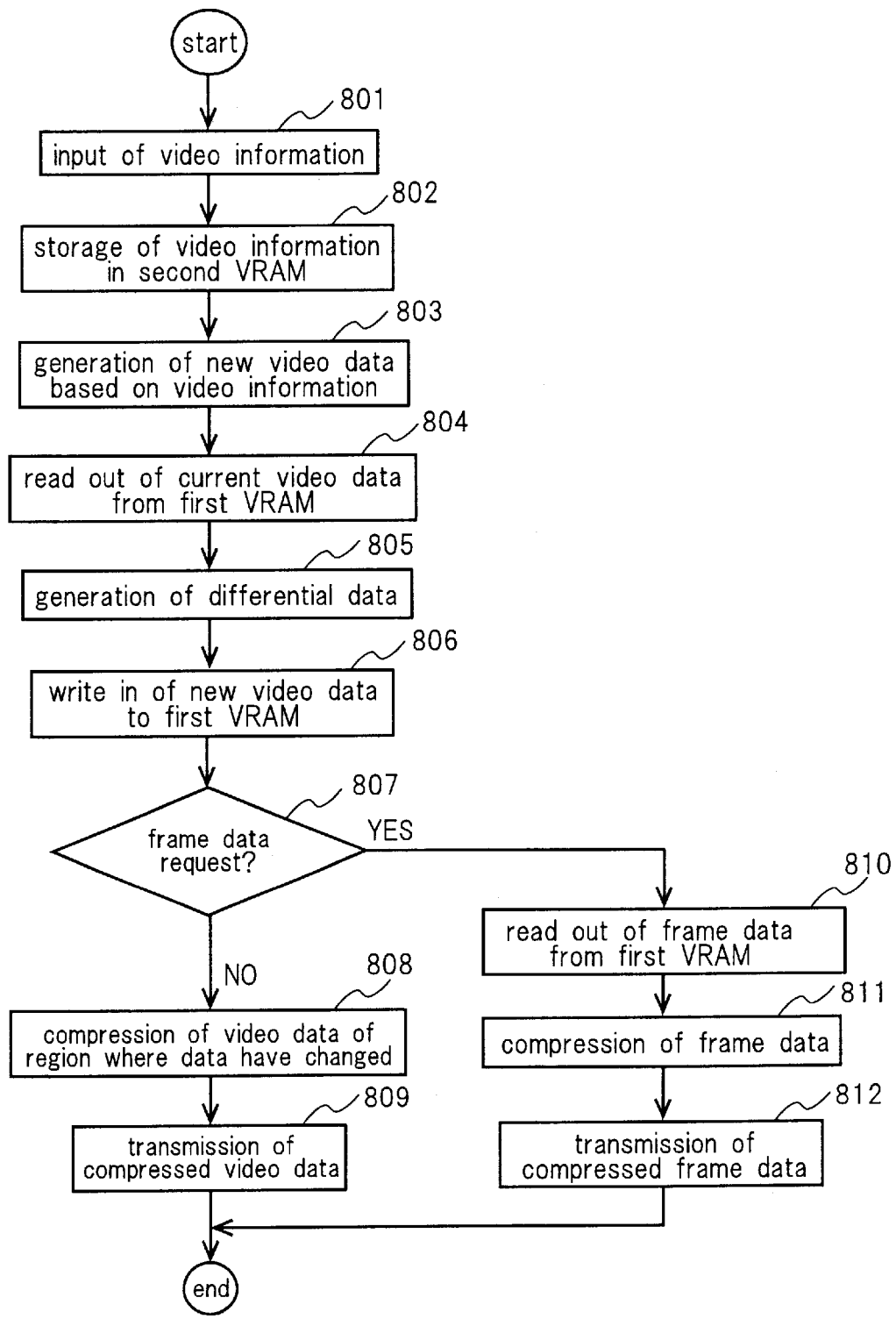
FIG. 8 is a flow chart at the transmission end of the transmission method for video information of Embodiment 2.
Figure 9:
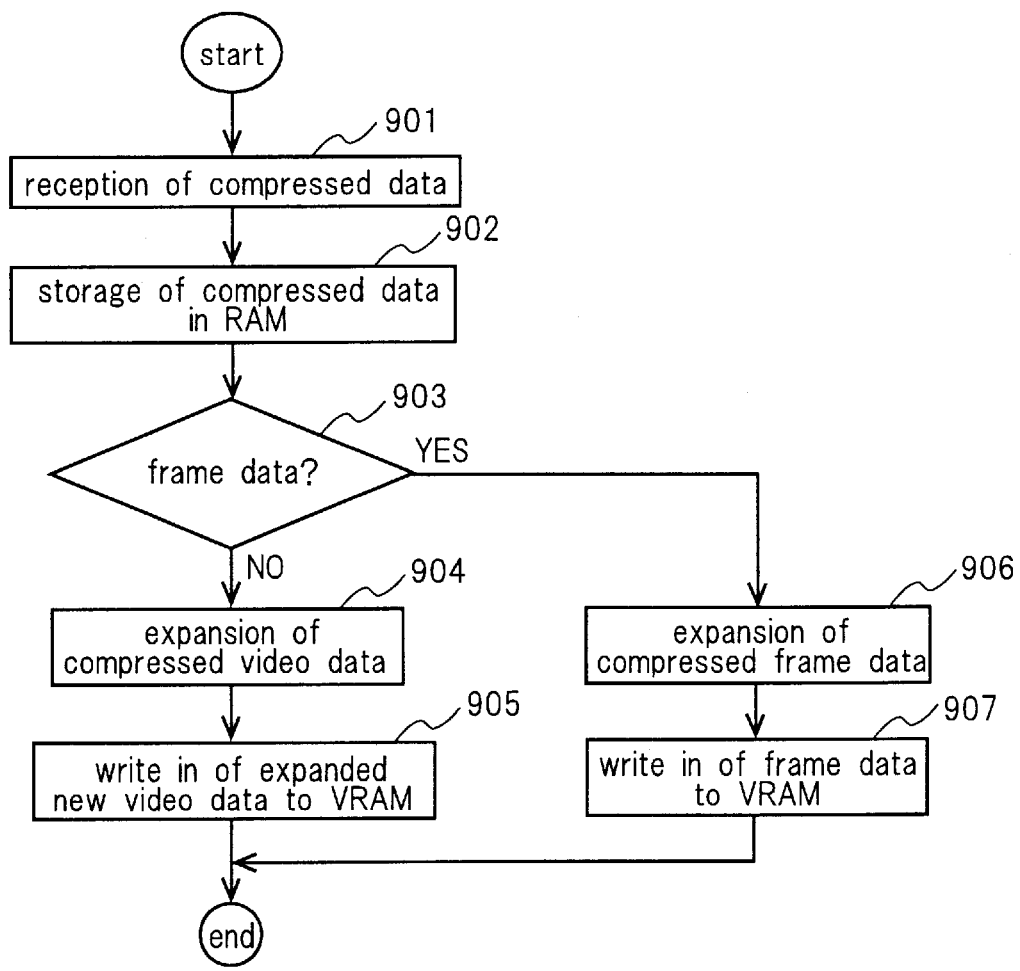
FIG. 9 is a flow chart at the reception end of the transmission method for video information of Embodiment 2.

In reference to FIGS. 8 and 9, the transmission method for video information of Embodiment 2 is described.

FIG. 8 is a flowchart of the transmission side (first terminal apparatus 601) of the transmission method for video information which uses the transmission apparatus and the transmission system of Embodiment 2.

First, the video graphics control part 613 inputs the video information 641 which is generated by the CPU 611 and which is written in a software language (Step 801). Next, the video graphics control part 613 inputs the video information 641 into the second VRAM 628 (Step 802). Next, the video information decoder 651 decodes the inputted video information 641 and generates new video data (level information of each pixel) 642 (Step 803).

Next, the update region extraction part 652 reads out the current video data 643 from the first VRAM 624 and then stores the video data in the second VRAM 628 (Step 804).

Next, the update region extraction part 652 subtracts the current video data from the new video data for each pixel and generates differential data 644 (Step 805).

Next, the update region extraction part 652 writes the new video data 642 into an appropriate region (address corresponding to each pixel of the new video data) of the first VRAM (Step 806).

Next, it is checked whether a frame data transmission request which occurs at constant intervals of time has occurred or not (Step 807). In the case that the frame data transmission request has occurred, the procedure proceeds to Step 810, and in the case that the frame data transmission request has not occurred, the procedure proceeds to Step 808.

In Step 808, video data (included in the new video data 642) of a region (for example, a rectangular region) which includes a pixel whose differential data are not 0 are extracted, and the information amount thereof is compressed. Next, in Step 809, the compressed data and the address information of the extracted region are multiplexed so as to generate multiplex data 646. The multiplex data (including the compressed video data) are transmitted in a wireless manner (Step 809). The procedure is, thus, completed.

In Step 807, in the case that there is a frame data transmission request, Steps 810 to 812 are carried out.

In Step 810, level information (frame data 645) of each pixel of the entirety of the screen is read out from the first VRAM 624 and is stored in the second VRAM 628.

Next, in Step 811, the information amount of the frame data 645 is compressed.

Next, in Step 812, the compressed frame data and the identification information, which indicates that the compressed data are frame data, are multiplexed so as to generate multiplex data 646. The multiplex data 646 (including the compressed data) are transmitted in a wireless manner.

FIG. 9 is a flow chart of the reception end (second terminal apparatus 602) of the transmission method for video information which uses the transmission apparatus and transmission system of Embodiment 2.

First, in Step 901, the wireless reception part 701 of the second terminal apparatus 602 receives the multiplex data 646 which includes the compressed video data.

The CPU 711 stores the multiplex data 646 (including the compressed data) in the RAM 717 (Step 902).

Next, the multiplex data are separated into address information and compressed data.

It is checked whether or not the multiplex data includes identification information that indicates that the compressed data are frame data (Step 903). In the case that the identification information that indicates that the compressed data are frame data is included, the procedure proceeds to Step 906 and in the case that the identification information is not included, the procedure proceeds to Step 904.

In the case that the compressed data are new video data of the extracted region, Steps 904 to 905 are carried out. In Step 904, the data expansion part 741 of the CPU 711 expands the compressed data and generates the expanded new video data 722 of the extracted region.

Next, the video data generation part 742 stores the new video data 722 in the VRAM 714 (Step 905). Video data of each pixel are read out from the VRAM 714 and are then displayed on the display 703. The procedure is thus completed.

In the case that the compressed data are frame data, Steps 906 to 907 are carried out. In Step 906, the data expansion part 741 of the CPU 711 expands the compressed data and generates the expanded frame data 723. Next, the video data generation part 742 stores the frame data 723 in the VRAM 714 (Step 907). Video data of each pixel are read out from the VRAM 714 and, then, are displayed on the display 703. The procedure is, thus, completed.

The present invention does not transmit the entirety of the video information but, rather, transmits only information of the region wherein the data has changed. In addition, the transmitted information amount can be further reduced by utilizing the differential information of the data (difference between the previous data and the current data).

According to the present invention, the advantageous effect can be gained that a transmission apparatus for video information, a transmission system for video information and a transmission method for video information which allow the transmission (particularly transmission by means of wireless communication) of video information at a low bit rate can be implemented regardless of differences in OSs.

Though the invention is described with respect to a preferred mode in a certain degree of detail, the present contents of the disclosure of this preferred mode should be modified in the details of the configuration and changes of the combination or order of each element can be implemented without deviating from the scope and spirit of the claims.

We claim:

1. A transmission apparatus for video information characterized by having:

an input part for inputting video information transmitted by a central processing unit;

a level information generation part for generating level information of each pixel on a screen based on, at least, said video information;

a memory part for storing level information of each pixel of the entire region of the screen;

a comparison part for comparing level information stored in said memory part with level information outputted by said level information generation part with respect to said pixel associated with said video information and for outputting comparison information;

a region extraction part for extracting a region that includes a pixel wherein the level information stored in said memory part and the level information based on said video information are different according to said comparison information;

a compression part for compressing the information amount of the level information of each pixel of said extracted region of the screen; and a communication part for transmitting position information of said region of the screen and said compressed level information.

2. A transmission apparatus for video information according to claim 1, characterized in that said communication part is a wireless communication part.

3. A transmission apparatus for video information according to claim 1, further characterized in that:

said update region level information generation part outputs level information of each pixel of the entire region of the screen at least once or more for a constant period of time;

said compression part compresses the information amount of the level information of said entire region of the screen; and said communication part transmits identification information for identifying said compressed level information of the entire region of the screen from said compressed level information of the region of the screen or said compressed differential information, as well as said compressed level information of the entire region of the screen.

4. A transmission system for video information characterized by having:

a first terminal apparatus that includes a central processing unit and a transmission apparatus for video information according to claim 1; and a second terminal apparatus, wherein said second terminal apparatus has:

a communication part for receiving said position information of the region of the screen and said compressed level information;

an expansion part for expanding said compressed level information and for outputting level information of each pixel of the extracted region of the screen;

a memory part for storing level information of each pixel of the entire region of the screen and for storing the level information of each pixel outputted by said expansion part according to said position information of the region of the screen; and a display part for displaying a screen according to level information of each pixel stored in said memory part.

5. A transmission system for video information according to claim 4, characterized in that said communication parts of said first terminal apparatus and said second terminal apparatus are wireless communication parts, respectively.

6. A transmission apparatus for video information characterized by having:

an input part for inputting video information transmitted by a central processing unit;

a level information generation part for generating level information of each pixel on a screen based on, at least, said video information;

a memory part for storing level information of each pixel of the entire region of the screen;

a comparison part for comparing level information stored in said memory part with level information outputted by said level information generation part with respect to said pixel associated with said video information and for outputting comparison information;

a region extraction part for extracting a region that includes a pixel wherein the level information stored in said memory part and the level information based on said video information are different according to said comparison information;

an update region level information generation part for generating differential information between the level information stored in said memory part and the level information outputted by said level information generation part with respect to each pixel of said extracted region of the screen;

a compression part for compressing the information amount of said differential information; and a communication part for transmitting position information of said region of the screen and said compressed differential information.

7. A transmission system for video information characterized by having:

a first terminal apparatus that includes a central processing unit and a transmission apparatus for video information according to claim 6; and a second terminal apparatus wherein said second terminal apparatus has:

a communication part for receiving said position information of the region of the screen and said compressed differential information;

an expansion part for expanding said compressed differential information and for generating differential information of each pixel of the extracted region of the screen;

a memory part for storing the level information of each pixel of the entire region of the screen and for storing the level information of each pixel generated by the level information generation part according to position information of said region of the screen;

said level information generation part for generating the level information of each pixel based on the differential information of each pixel generated by said expansion part and level information of each pixel stored in said memory part; and a display part for displaying a screen according to the level information of each pixel stored in said memory part.

8. A transmission method for video information characterized by having:

an input step for inputting video information transmitted by a central processing unit;

a level information generation step for generating the level information of each pixel on a screen based on, at least, said video information;

a comparison step for comparing level information stored in a memory part with level information generated in said level information generation step in respect to said pixel associated with said video information and for generating comparison information;

a region extraction step for extracting a region that includes a pixel wherein the level information stored in said memory part and the level information based on said video information are different according to said comparison information;

a compression step for compressing the information amount of the level information of each pixel of said extracted region of the screen; and a communication step for transmitting position information of said region of the screen and said compressed level information.

9. A transmission method for video information according to claim 8, characterized in that a wireless communication is carried out in said communication step.

10. A transmission method for video information according to claim 8, characterized by further having:

an entire region level information generation step for reading out the level information of each pixel of the entire region of the screen from said memory part with a frequency of, at least, once or more in a constant period of time;

an entire region level information compression step for compressing the information amount of the level information of the entire region of the screen; and an entire region level information transmission step for transmitting identification information for identifying said compressed level information of the entire region of the screen from said compressed level information of the region of the screen or said compressed differential information, as well as said compressed level information of the entire region of the screen.

11. A transmission method for video information characterized by having:

each step of the transmission method for video information according to claim 8;

a communication step for receiving position information of said region of the screen and said compressed level information;

an expansion step for expanding said compressed level information and for outputting the level information of each pixel of the extracted region of the screen;

a memory step for storing said level information of each pixel generated in the expansion step according to the position information of said region of the screen; and a display step for displaying a screen according to the level information of each pixel stored in said memory part.

12. A transmission method for video information according to claim 11, characterized in that said transmission step and said reception step are carried out by means of a wireless communication.

13. A transmission method for video information characterized by having:

an input step for inputting video information transmitted by a central processing unit;

a level information generation step for generating level information of each pixel on the screen based on, at least, said video information;

a comparison step for comparing the level information stored in a memory part with the level information generated in said level information generation step with respect to said pixel associated with said video information and for generating comparison information;

a region extraction step for extracting a region which includes a pixel wherein the level information stored in said memory and the level information based on said video information are different according to said comparison information;

an update region level information generation step for generating differential information between the level information stored in said memory part and the level information generated in said level information generation step with respect to each pixel of said extracted region of the screen;

a compression step for compressing the information amount of said differential information; and a communication step for transmitting position information of said region of the screen and said compressed differential information.

14. A transmission method for video information characterized by having:

each step of the transmission method for video information according to claim 13;

a reception step for receiving position information of said region of the screen and said compressed differential information;

an expansion step for expanding said compressed differential information and for generating differential information of each pixel of the extracted region of the screen;

a level information generation step for generating the level information of each pixel based on the differential information of each pixel generated in said expansion step and the level information of each pixel stored in the memory part;

a memory step for storing the level information of each pixel generated in said level information generation step in said memory part according to the position information of said region of the screen; and a display step for displaying a screen according to the level information of each pixel stored in said memory part.

* * * * *